United States Patent
Lee

(10) Patent No.: US 9,783,126 B2
(45) Date of Patent: Oct. 10, 2017

(54) APPARATUS FOR CONTROLLING LAMP FOR VEHICLE AND METHOD FOR CONTROLLING LAMP FOR VEHICLE USING THE SAME

(71) Applicant: MANDO CORPORATION, Pyeongtaek-si, Gyeonggi-do (KR)

(72) Inventor: Jun-Hee Lee, Suwon-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 442 days.

(21) Appl. No.: 14/305,379

(22) Filed: Jun. 16, 2014

(65) Prior Publication Data
US 2015/0042801 A1  Feb. 12, 2015

(30) Foreign Application Priority Data
Aug. 7, 2013  (KR) .................. 10-2013-0093394

(51) Int. Cl.
| H04N 13/02 | (2006.01) |
| G01J 1/42 | (2006.01) |
| B60R 11/04 | (2006.01) |
| B60Q 1/14 | (2006.01) |
| H04N 7/18 | (2006.01) |
| G06K 9/00 | (2006.01) |

(52) U.S. Cl.
CPC .............. B60R 11/04 (2013.01); B60Q 1/143 (2013.01); G06K 9/00825 (2013.01); H04N 7/183 (2013.01); B60Q 2300/41 (2013.01); B60Q 2300/42 (2013.01)

(58) Field of Classification Search
CPC ............ B60R 11/04; B60C 1/85; B60C 1/143
See application file for complete search history.

(56) References Cited

U.S. PATENT DOCUMENTS

| 7,791,459 B2 * | 9/2010 | Teramura ............... B60Q 1/085 340/438 |
| 2014/0177243 A1 * | 6/2014 | Noh ....................... B60Q 1/143 362/466 |

FOREIGN PATENT DOCUMENTS

| CN | 1153116 A | 7/1997 |
| CN | 1602260 A | 3/2005 |

(Continued)

OTHER PUBLICATIONS

Chinese Office Action for corresponding Chinese Patent Application No. 201410273429.8 dated Feb. 3, 2016.
(Continued)

*Primary Examiner* — Sath V Perungavoor
*Assistant Examiner* — Patricia I Young
(74) *Attorney, Agent, or Firm* — Hauptman Ham, LLP

(57) ABSTRACT

Disclosed herein are an apparatus for controlling a lamp for vehicles and a method of controlling a lamp for vehicles using the same. The apparatus includes a first sensing unit to sense information regarding approaching to a current object when one's own vehicle is running, a second sensing unit to sense current brightness information of the lamp installed at the vehicle when the vehicle is running, a control unit receiving the information regarding approaching to a current object sensed by the first sensing unit and the current brightness information sensed by the second sensing unit and including a range of information regarding approaching to a preset reference object and a range of reference brightness information.

17 Claims, 19 Drawing Sheets

(56) References Cited

FOREIGN PATENT DOCUMENTS

| CN | 101342892 A | 1/2009 |
|---|---|---|
| CN | 102029941 A | 4/2011 |
| KR | 1020090112131 A | 10/2009 |

OTHER PUBLICATIONS

Chinese Office Action for corresponding Chinese Patent Application No. 201410273429.8 dated Feb. 7, 2017.
Chinese Office Action dated Jul. 13, 2017 corresponding to Chinese Application No. 201410273429.8.

* cited by examiner

APPARATUS FOR CONTROLLING LAMP FOR VEHICLE AND METHOD FOR CONTROLLING LAMP FOR VEHICLE USING THE SAME

CROSS-REFERENCE TO RELATED APPLICATION(S)

This application claims the benefit of Korean Patent Application No. 2013-0093394, filed on Aug. 7, 2013 in the Korean Intellectual Property Office, the disclosure of which is incorporated herein by reference.

BACKGROUND

1. Field

Embodiments of the present invention relate to apparatus for controlling a lamp for vehicles and a method of controlling a lamp for vehicles using the same.

2. Description of the Related Art

In general, conventional lamps for vehicles are provided to allow a driver to recognize a current object with the naked eyes while driving at night.

To increase recognition rate of a current object, a driver has to increase a brightness level of a conventional lamp for vehicles and thus there are limitations in enhancing efficiency of driving and in inhibiting glare of the lamp to at least one of a driver of a preceding vehicle and a driver of an oncoming vehicle in the opposite lane and, accordingly, there are limitations in preventing traffic accidents.

Thus, recently, research into an apparatus and method for controlling a lamp for vehicles that may increase efficiency of driving by efficiently enhancing a recognition rate of a current object and inhibit glare of the lamp to at least one of a driver of a preceding vehicle and a driver of an oncoming vehicle in the opposite lane, whereby traffic accidents may be prevented, has been conducted.

In addition, research into an apparatus and method for controlling a lamp for vehicles that may prevent traffic accidents by encouraging a driver to drive carefully has recently been underway.

SUMMARY

Therefore, it is an aspect of the present invention to provide an apparatus for controlling a lamp for vehicles and a method for controlling a lamp for vehicles using the same that may increase efficiency of driving and inhibit glare of the lamp to at least one of a driver of a preceding vehicle and a driver of an oncoming vehicle in the opposite lane, whereby traffic accidents may be prevented.

It is another aspect of the present invention to provide an apparatus for controlling a lamp for vehicles and a method for controlling a lamp for vehicles using the same that may further prevent traffic accidents by encouraging a driver to carefully drive.

Additional aspects of the invention will be set forth in part in the description which follows and, in part, will be obvious from the description, or may be learned by practice of the invention.

In accordance with one aspect of the present invention, an apparatus for controlling a lamp for vehicles includes a first sensing unit to sense information regarding approaching to a current object when one's own vehicle is running, a second sensing unit to sense current brightness information of the lamp installed at the vehicle when the vehicle is running, a control unit receiving the information regarding approaching to a current object sensed by the first sensing unit and the current brightness information sensed by the second sensing unit and including a range of information regarding approaching to a preset reference object and a range of reference brightness information, a determination unit to determine, under control of the control unit, whether the information regarding approaching to a current object sensed by the first sensing unit is within the range of information regarding approaching to a preset reference object and the current brightness information sensed by the second sensing unit is outside the range of reference brightness information, and a brightness level adjustment unit to adjust a level of the current brightness information of the lamp under control of the control unit so as to emit light by adjusting the current brightness information to the range of reference brightness information, when the determination unit determines that the information regarding approaching to a current object is within the range of information regarding approaching to a preset reference object and the current brightness information is outside the range of reference brightness information.

The current brightness information may be at least one of a current high beam emission amount and a current low beam emission amount and the range of reference brightness information may be a range of at least one of a reference high beam emission amount and a reference low beam emission amount.

The current brightness information may be a brightness area of a current road surface and the range of reference brightness information may be a range of at least one of a first brightness area and a second brightness area of a reference road surface.

The information regarding approaching to a current object may be at least one of remaining distance and approach speed and time to reach the current object and the information regarding approaching to a reference object may be at least one of remaining distance and approach speed and time to reach the reference object.

When the determination unit determines that the information regarding approaching to a current object is within the range of information regarding approaching to a preset reference object and a current high beam emission amount corresponding to the current brightness information is outside a range of a reference low beam emission amount corresponding to the range of reference brightness information, the brightness level adjustment unit may decrease a level of the current high beam emission amount corresponding to the current brightness information under control of the control unit so as to emit light by adjusting the current high beam emission amount to the range of the reference low beam emission amount.

When the determination unit determines that the information regarding approaching to a current object is outside the range of information regarding approaching to a preset reference object and a current low beam emission amount corresponding to the current brightness information is outside a range of a reference high beam emission amount corresponding to the range of reference brightness information, the brightness level adjustment unit may increase a level of the current low beam emission amount corresponding to the current brightness information of the lamp under control of the control unit so as to emit light by adjusting the current low beam emission amount to the range of the reference high beam emission amount.

The apparatus may further include a first identification unit to identify a level state of the current brightness information when the determination unit determines that the information regarding approaching to a current object is within the range of information regarding approaching to a preset reference object and the current brightness information is outside the range of reference brightness information.

The apparatus may further include a second identification unit to identify adjustment of a level of the current brightness information when the determination unit determines that the information regarding approaching to a current object is within the range of information regarding approaching to a preset reference object and the current brightness information is outside the range of reference brightness information.

The apparatus may further include a third identification unit to identify that adjustment of a level of the current brightness information is completed when the brightness level adjustment unit completes adjustment of the level of the current brightness information of the lamp under control of the control unit so as to emit light by adjusting the current brightness information to the range of reference brightness information.

In accordance with another aspect of the present invention, a method of controlling a lamp for vehicles includes sensing information regarding approaching to a current object when one's own vehicle is running, the sensing being performed by a first sensing unit, sensing current brightness information of the lamp installed at the vehicle when the vehicle is running, the sensing being performed by a second sensing unit, determining, under control of the control unit, whether the information regarding approaching to a current object sensed by the first sensing unit is within a range of information regarding approaching to a preset reference object, the range being set by the control unit and the current brightness information sensed by the second sensing unit is outside a range of reference brightness information set by the control unit, and adjusting a level of the current brightness information of the lamp under control of the control unit so as to emit light by adjusting the current brightness information to the range of reference brightness information, the adjusting being performed by a brightness level adjustment unit, when the determination unit determines that the information regarding approaching to a current object is within the range of information approaching to a preset reference objet and the current brightness information is outside the range of reference brightness information.

In at least one of the sensing of the current brightness information, the determining, and the adjusting, the current brightness information may be at least one of a current high beam emission amount and a current low beam emission amount, and the range of reference brightness information may be a range of at least one of a reference high beam emission amount and a reference low beam emission amount.

In at least one of the sensing of the current brightness information, the determining, and the adjusting, the current brightness information may be provided as a brightness area of a current road surface and the range of reference brightness information may be provided as a range of a first brightness area of a reference road surface and a range of a second brightness area of the reference road surface.

In at least one of the sensing of the information, the determining, and the adjusting, the information regarding approaching to a current object may be provided as at least one of remaining distance and approach speed and time to reach the current object and the information regarding approaching to a preset reference object may be provided as a range of at least one of remaining distance and approach speed and time to reach the reference object.

When the determination unit determines that the information regarding approaching to a current object is within the range of information approaching to a preset reference object and a current high beam emission amount corresponding to the current brightness information is outside a range of a reference low beam emission amount corresponding to the range of reference brightness information, the adjusting may include decreasing a level of the current high beam emission amount corresponding to the current brightness information of the lamp under control of the control unit so as to emit light by adjusting the current high beam emission amount to the range of the reference low beam emission amount, the adjusting being performed by the brightness level adjustment unit.

When the determination unit determines that the information regarding approaching to a current object is outside the range of information approaching to a preset reference object and a current low beam emission amount corresponding to the current brightness information is outside a range of a reference high beam emission amount corresponding to the range of reference brightness information, the adjusting may include increasing a level of the current low beam emission amount corresponding to the current brightness information of the lamp under control of the control unit so as to emit light by adjusting the current low beam emission amount to the range of the reference high beam emission amount, the adjusting being performed by the brightness level adjustment unit.

The method may further include, after the determining, performing first identification to identify a level state of the current brightness information, the performing being performed by a first identification unit, when the determination unit determines that the information regarding approaching to a current object is within the range of information approaching to a preset reference object and the current brightness information is outside the range of reference brightness information.

The method may further include, after the determining, performing second identification to identify adjustment of a level of the current brightness information, the performing being performed by a second identification unit, when the determination unit determines that the information regarding approaching to a current object is within the range of information approaching to a preset reference object and the current brightness information is outside the range of reference brightness information.

The method may further include, after the adjusting, performing third identification to identify that the adjusting of the level of the current brightness information is completed, the performing being performed by a third identification unit, when the brightness level adjustment unit completes adjustment of the level of the current brightness information of the lamp under control of the control unit so as to emit light by adjusting the current brightness information to the range of reference brightness information.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
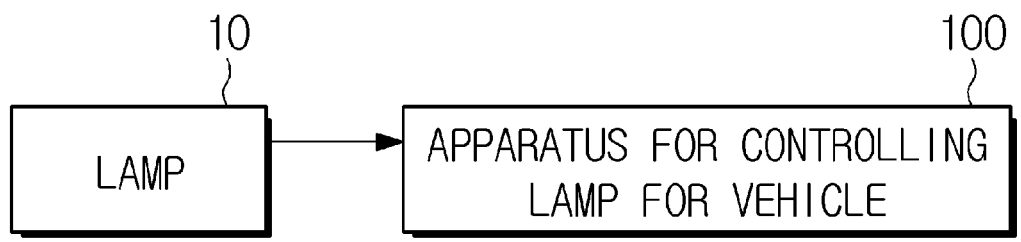
FIG. 1 is a block diagram illustrating a state in which an apparatus for controlling a lamp for vehicles according to a first embodiment of the present invention is connected to the lamp.

Reference will now be made in detail to the embodiments of the present invention, examples of which are illustrated in the accompanying drawings, wherein like reference numerals refer to like elements throughout.

Hereinafter, exemplary embodiments of the present invention will be described in detail with reference to the accompanying drawings.

Figure 2:
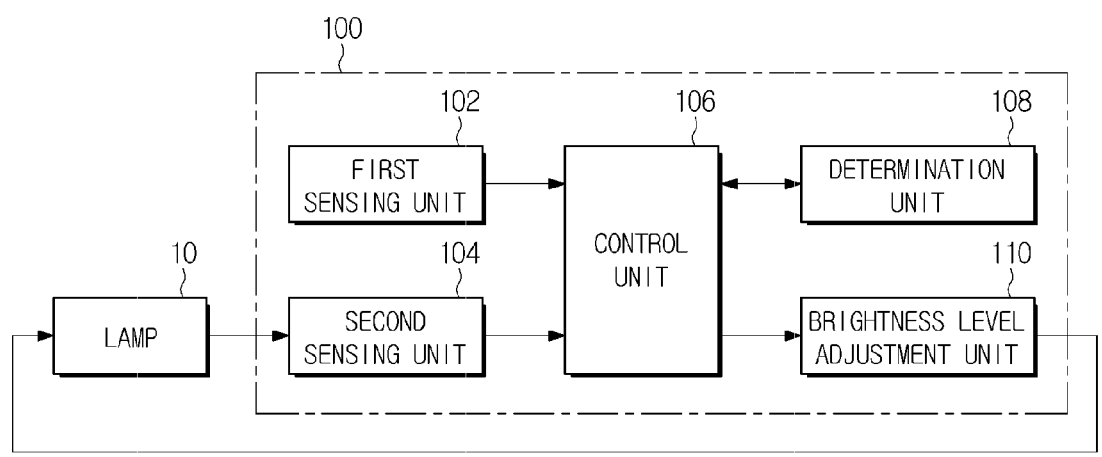
FIG. 2 is a block diagram illustrating an example of the apparatus illustrated in FIG. 1.

FIG. 1 is a block diagram illustrating a state in which an apparatus 100 for controlling a lamp for vehicles according to a first embodiment of the present invention first embodiment is connected to the lamp. FIG. 2 is a block diagram illustrating an example of the apparatus of FIG. 1.

Figure 3:
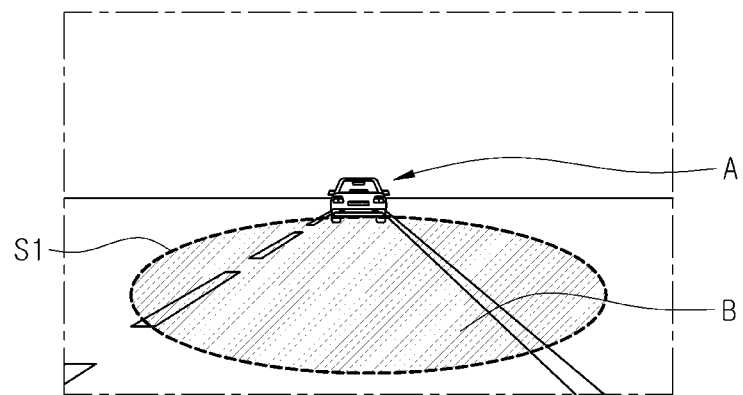
FIG. 3 is a front view illustrating a brightness area of a current road surface according to a current high beam emission amount sensed by first and second sensing units of the apparatus of FIG. 2.
Figure 4:
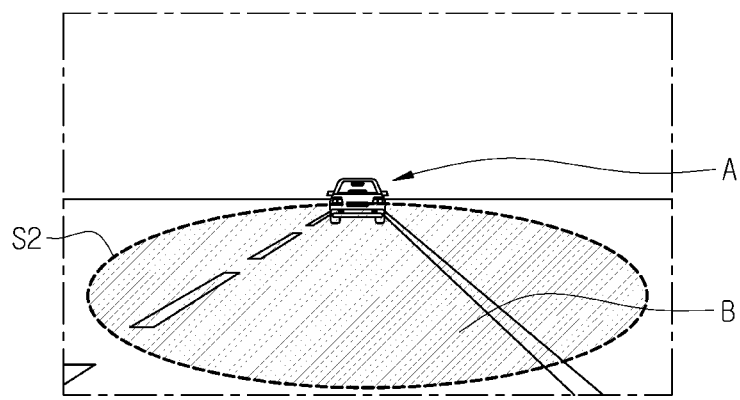
FIG. 4 is a front view illustrating a brightness area of a current road surface according to a current low beam emission amount sensed by first and second sensing units of the apparatus of FIG. 2.

FIG. 3 is a front view illustrating a brightness area of a current road surface according to a current high beam emission amount sensed by a first sensing unit 102 and a second sensing unit 104 of the apparatus 100 of FIG. 2. FIG. 4 is a front view illustrating a brightness area of a current road surface according to a current low beam emission amount sensed by the first and second sensing units 102 and 104 of FIG. 2.

Referring to FIGS. 1 to 4, the apparatus 100 according to the first embodiment of the present invention includes the first sensing unit 102, the second sensing unit 104, a control unit 106, a determination unit 108, and a brightness level adjustment unit 110.

The first sensing unit 102 is provided to sense information regarding approaching to a current object A when one's own vehicle is running, and the second sensing unit 104 is provided to sense current brightness information of a lamp 10 installed at the vehicle when the vehicle is running.

In this regard, the information regarding approaching to the current object A may include at least one of remaining distance and approach speed and time to reach the current object A.

In this regard, the current object A may include at least one of a preceding vehicle and an oncoming vehicle in the opposite lane.

In addition, the current brightness information may include at least one of a current high beam emission amount and a current low beam emission amount and may include brightness areas S1 and S2 of a current road surface B.

In addition, although not shown in the drawings, the first sensing unit 102 may include an approaching sensor (not shown) and the second sensing unit 104 may include a brightness sensor (not shown).

The control unit 106 receives the information regarding approaching to the current object A sensed by the first sensing unit 102 and the current brightness information sensed by the second sensing unit 104 and includes a range of information regarding approaching to a preset reference object and a range of reference brightness information.

In this regard, the information regarding approaching to a preset reference object may include at least one selected from among remaining distance and approach speed and time to reach the reference object.

In addition, the range of reference brightness information may include a range of at least one of a reference high beam emission amount and a reference low beam emission amount and may be a range of a brightness area of a reference road surface.

The determination unit 108 is provided to determine, under control of the control unit 106, whether the information regarding approaching to the current object A, sensed by the first sensing unit 102, is within the range of information regarding approaching to a reference object and the current brightness information sensed by the second sensing unit 104 is outside the range of reference brightness information.

In an embodiment, the determination unit 108 may be provided to determine, under control of the control unit 106, whether at least one of remaining distance and approach speed and time to reach the current object A sensed by the first sensing unit 102 is within a range of at least one of remaining distance and approach speed and time to reach the reference object and the current high beam emission amount sensed by the second sensing unit 104 is outside the range of the reference low beam emission amount.

On the other hand, the determination unit 108 may be provided to determine, under control of the control unit 106, whether at least one of remaining distance and approach speed and time to reach the current object A, sensed by the first sensing unit 102, is outside the range of at least one of remaining distance and approach speed and time to reach the reference object and the current low beam emission amount sensed by the second sensing unit 104 is outside the range of the reference high beam emission amount.

In another embodiment, the determination unit 108 may be provided to determine, under control of the control unit 106, whether at least one of remaining distance and approach speed and time to reach the current object A, sensed by the first sensing unit 102, is within the range of at least one of remaining distance and approach speed and time to reach the reference object and a brightness area S of a current road surface B sensed by the second sensing unit 104 is outside a range of a first brightness area of a reference road surface.

On the other hand, the determination unit 108 may be provided to determine, under control of the control unit 106, whether at least one of remaining distance and approach speed and time to reach the current object A, sensed by the first sensing unit 102, is outside the range of at least one of remaining distance and approach speed and time to reach the reference object and the brightness area S of the current road surface B sensed by the second sensing unit 104 is outside a range of a second brightness area of the reference road surface.

The brightness level adjustment unit 110 adjusts a level of current brightness information of the lamp 10 under control of the control unit 106 so as to emit light by adjusting the current brightness information to the range of reference brightness information, when the determination unit 108 determines that information regarding approaching to the current object A is within the range of information regarding approaching to a reference object and the current brightness information is outside the range of reference brightness information.

In an embodiment, when the determination unit 108 determines that at least one of remaining distance and approach speed and time to reach the current object A is within the range of at least one of remaining distance and approach speed and time to reach the reference object and the current high beam emission amount corresponding to the current brightness information is outside the range of the reference low beam emission amount corresponding to to the range of reference brightness information, the brightness level adjustment unit 110 may reduce a level of the current high beam emission amount corresponding to the current brightness information of the lamp 10 under control of the control unit 106 so as to emit light by adjusting the current high beam emission amount to the range of the reference low beam emission amount.

On the other hand, when the determination unit 108 determines that at least one of remaining distance and approach speed and time to reach the current object A is outside the range of at least one of remaining distance and approach speed and time to reach the reference object and the current low beam emission amount corresponding to the current brightness information is outside the range of the reference high beam emission amount corresponding to the range of reference brightness information, the brightness level adjustment unit 110 may increase a level of the current low beam emission amount corresponding to the current brightness information of the lamp 10 under control of the control unit 106 so as to emit light by adjusting the current low beam emission amount to the range of the reference high beam emission amount.

In another embodiment, when the determination unit 108 determines that at least one of remaining distance and approach speed and time to reach the current object A is within the range of at least one of remaining distance and approach speed and time to reach the reference object and the brightness area S of the current road surface B that corresponds to the current brightness information is outside the range of the first brightness area of the reference road surface that corresponds to the range of reference brightness information, the brightness level adjustment unit 110 may decrease the brightness area S of the current road surface B that corresponds to the current brightness information of the lamp 10 under control of the control unit 106 so as display the brightness area S of the current road surface B to be adjusted to the range of the first brightness area of the reference road surface.

On the other hand, when the determination unit 108 determines that at least one of remaining distance and approach speed and time to reach the current object A is outside the range of at least one of remaining distance and approach speed and time to reach the reference object and the brightness area S of the current road surface B that corresponds to the current brightness information is outside the range of the second brightness area of the reference road surface that corresponds to the range of reference brightness information, the brightness level adjustment unit 110 may increase the brightness area S of the current road surface B that corresponds to the current brightness information of the lamp 10 under control of the control unit 106 so as to display the brightness area S of the current road surface B to the range of the second brightness area of the reference road surface.

In this regard, although not shown in the drawings, the control unit 106, the determination unit 108, and the brightness level adjustment unit 110 may include a general electric control unit (ECU, not shown) as a main computer applied to vehicles for control and determination of overall operations and adjustment of a brightness level or a general micro control unit (MCU, not shown) that includes a processor, a memory and input/output devices inside a single chip and thus controls and determines overall operations and adjusts a brightness level. Embodiments of the present invention are not limited to the above examples, and the control unit 106, the determination unit 108, and the brightness level adjustment unit 110 may be any control member and determination member for control and determination of overall operations of a vehicle and any brightness level adjustment member for adjustment of a brightness level.

In this regard, the control unit 106, the determination unit 108, and the brightness level adjustment unit 110 may be an ECU or MCU in an integral form or in a separate form.

Hereinafter, a method of controlling the lamp 10 for vehicles using the apparatus 100 according to the first embodiment of the present invention will be described with reference to FIGS. 5 to 7.

Figure 5:
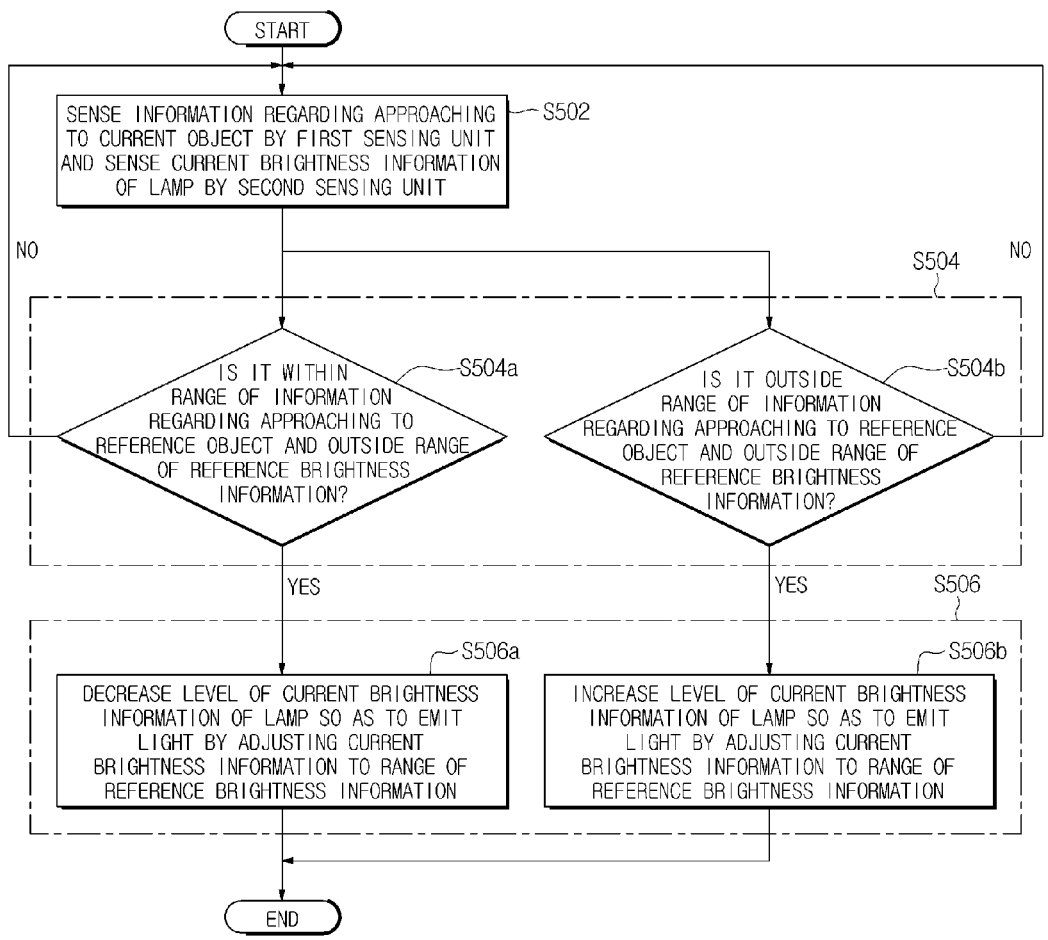
FIG. 5 is a flowchart illustrating a method of controlling a lamp for vehicles using the apparatus according to the first embodiment of the present invention.

FIG. 5 is a flowchart illustrating a method of controlling a lamp for vehicles using the apparatus 100 according to the first embodiment of the present invention. FIG. 6 is a flowchart illustrating an example of the method of controlling a lamp for vehicles using the apparatus 100 according to the first embodiment of the present invention.

Figure 7:
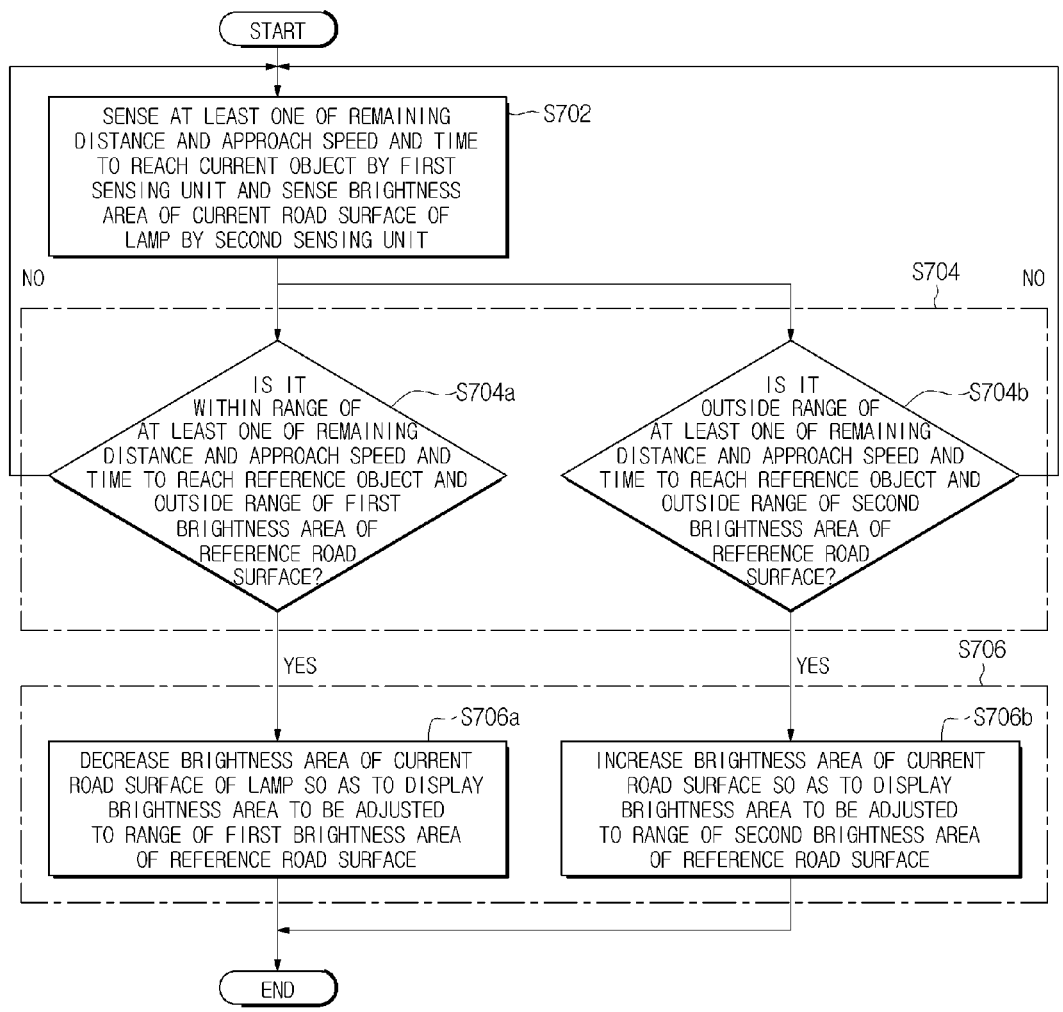
FIG. 7 is a flowchart illustrating another example of the method of controlling a lamp for vehicles using the apparatus according to the first embodiment of the present invention.

FIG. 7 is a flowchart illustrating another example of the method of controlling a lamp for vehicles using the apparatus 100 according to the first embodiment of the present invention.

Figure 6:
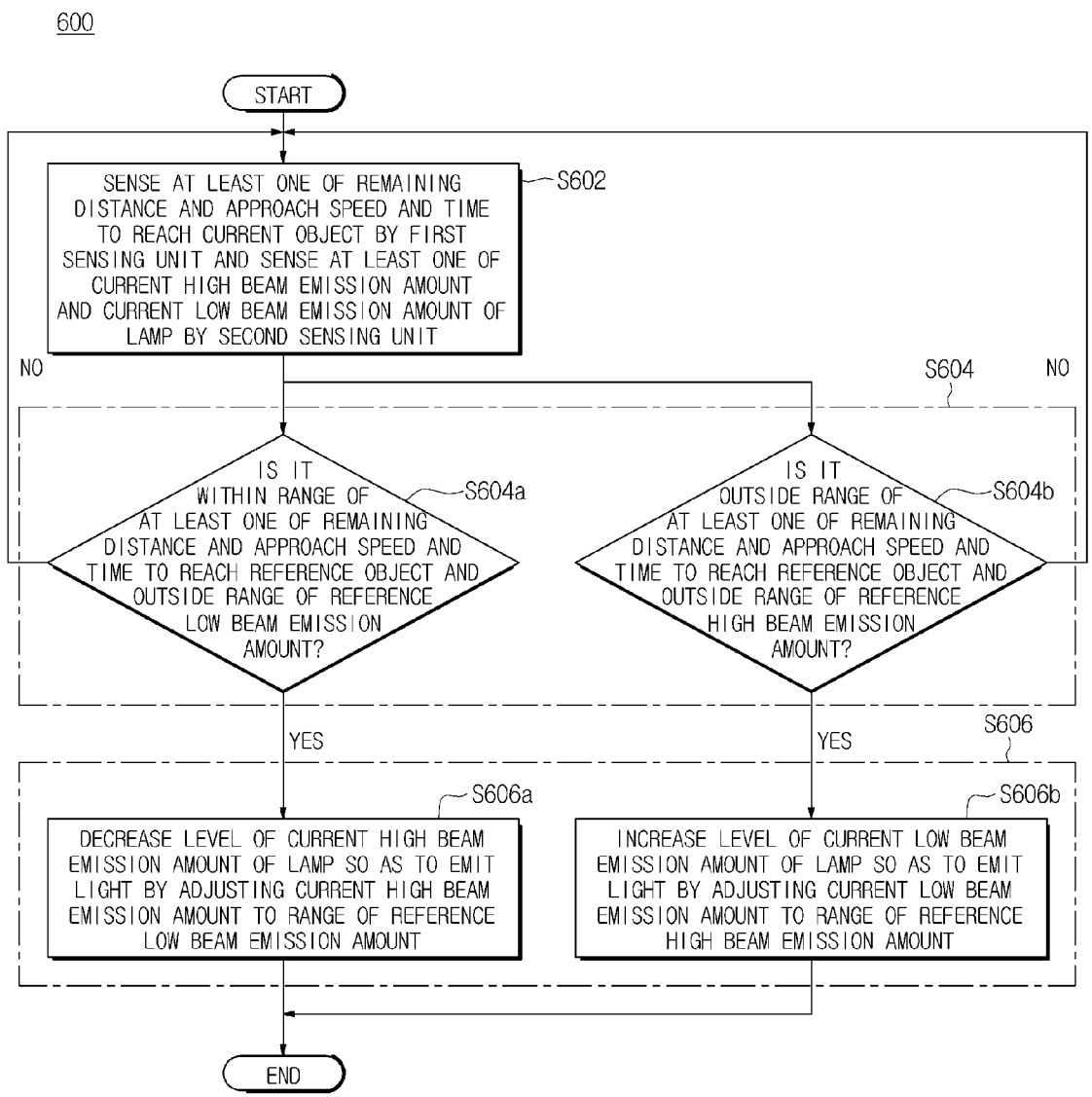
FIG. 6 is a flowchart illustrating an example of the method of controlling a lamp for vehicles using the apparatus according to the first embodiment of the present invention.

Referring to FIGS. 5 to 7, the method (operation 500, 600 or 700) of controlling a lamp for vehicles using the apparatus 100 (see FIGS. 1 and 2) according to the first embodiment of the present invention includes sensing (operation S502, S602 or S702), determining (operation S504, S604 or S704), and adjusting a brightness level (operation S506, S606 or S706).

First, the sensing (operation S502) includes sensing information regarding approaching to the current object A (see FIGS. 3 and 4) while one's own vehicle is running, performed by the first sensing unit 102 (see FIG. 2) and sensing current brightness information of the lamp 10 (see FIG. 1), performed by the second sensing unit 104 (see FIG. 2).

In an embodiment, as illustrated in FIG. 6, the sensing (operation S602) may include sensing at least one of remaining distance and approach speed and time to reach the current object A (see FIGS. 3 and 4) that correspond to information regarding approaching to the current object A (see FIGS. 3 and 4) while one's own vehicle is running, performed by the first sensing unit 102 (see FIG. 2) and sensing at least one of a current high beam emission amount and a current low beam emission amount that correspond to the current brightness information of the lamp 10 (see FIGS. 1 and 2) installed at the one's own vehicle, performed by the second sensing unit 104 (see FIG. 2).

In another embodiment, as illustrated in FIG. 7, the sensing (operation S702) may include sensing at least one of remaining distance and approach speed and time to reach the current object A (see FIGS. 3 and 4) that correspond to information regarding approaching to the current object A (see FIGS. 3 and 4) while one's own vehicle is running, performed by the first sensing unit 102 (see FIG. 2) and sensing the brightness area S1 or S2 (see FIG. 3 or 4) of the current road surface B (see FIGS. 3 and 4) that corresponds to the current brightness information of the lamp 10 (see FIGS. 1 and 2) installed at the one's own vehicle, performed by the second sensing unit 104 (see FIG. 2).

Subsequently, the determining (operation S504) includes determining, under control of the control unit 106 (see FIG. 2), whether the information regarding approaching to the current object A (see FIGS. 3 and 4), sensed by the first sensing unit 102 (see FIG. 2) is within the range of information regarding approaching to a reference object set by the control unit 106 (see FIG. 2) and the current brightness information sensed by the second sensing unit 104 (see FIG. 2) is outside the range of reference brightness information set by the control unit 106 (see FIG. 2), wherein the determining is performed by the determination unit 108 (see FIG. 2).

In an embodiment, as illustrated in FIG. 6, the determining (operation S604a) may include determining, under control of the control unit 106 (see FIG. 2), whether at least one of remaining distance and approach speed and time to reach the current object A (see FIGS. 3 and 4), sensed by the first sensing unit 102 (see FIG. 2), is within the range of at least one of remaining distance and approach speed and time to reach the reference object and the current high beam emission amount sensed by the second sensing unit 104 (see FIG. 2) is outside the range of the reference low beam emission amount, wherein the determining is performed by the determination unit 108 (see FIG. 2).

On the other hand, as illustrated in FIG. 6, the determining (operation S604b) may include determining, under control of the control unit 106 (see FIG. 2), whether at least one of remaining distance and approach speed and time to reach the current object A (see FIGS. 3 and 4), sensed by the first sensing unit 102 (see FIG. 2), is outside the range of at least one of remaining distance and approach speed and time to reach the reference object and the current low beam emission amount sensed by the second sensing unit 104 (see FIG. 2) is outside the range of the reference high beam emission amount, wherein the determining is performed by the determination unit 108 (see FIG. 2).

In another embodiment, as illustrated in FIG. 7, the determining (operation S704a) may include determining, under control of the control unit 106 (see FIG. 2), whether at least one of remaining distance and approach speed and time to reach the current object A (see FIGS. 3 and 4), sensed by the first sensing unit 102 (see FIG. 2), is within the range of at least one of remaining distance and approach speed and time to reach the reference object and the brightness area S1 or S2 (see FIG. 3 or 4) of the current road surface B (see FIGS. 3 and 4), sensed by the second sensing unit 104 (see FIG. 2), is outside the range of the first brightness area of the reference road surface, wherein the determining is performed by the determination unit 108 (see FIG. 2).

On the other hand, as illustrated in FIG. 7, the determining (operation S704b) may include determining, under control of the control unit 106 (see FIG. 2), whether at least one of remaining distance and approach speed and time to reach the current object A (see FIGS. 3 and 4), sensed by the first sensing unit 102 (see FIG. 2), is outside the range of at least one of remaining distance and approach speed and time to reach the reference object and the brightness area S1 or S2 (see FIG. 3 or 4) of the current road surface B (see FIGS. 3 and 4), sensed by the second sensing unit 104 (see FIG. 2), is outside the range of the second brightness area of the reference road surface, wherein the determining is performed by the determination unit 108 (see FIG. 2).

Lastly, when the determination unit 108 (see FIG. 2) determines that information regarding approaching to the current object A (see FIGS. 3 and 4) is within the range of information regarding approaching to a reference object and the current brightness information is outside the range of reference brightness information, the adjusting of the brightness level (operation S506) includes adjusting a level of the current brightness information of the lamp 10 (see FIG. 2) under control of the control unit 106 (see FIG. 2) so as to emit light by adjusting the current brightness information to the range of reference brightness information, wherein the adjusting is performed by the brightness level adjustment unit 110 (see FIG. 2).

In an embodiment, as illustrated in FIG. 6, when the determination unit 108 (see FIG. 2) determines that at least one of remaining distance and approach speed and time to reach the current object A (see FIG. 4) is within the range of at least one of remaining distance and approach speed and time to reach the reference object and the current high beam emission amount corresponding to the current brightness information is outside the range of the reference low beam emission amount that corresponds to the range of reference brightness information, the adjusting of the brightness level (operation S606a) may include decreasing a level of the current high beam emission amount corresponds to the current brightness information of the lamp 10 (see FIG. 2) under control of the control unit 106 (see FIG. 2) so as to emit light by adjusting the current high beam emission amount to the range of the reference low beam emission amount, wherein the decreasing is performed by the brightness level adjustment unit 110 (see FIG. 2).

On the other hand, as illustrated in FIG. 6, when the determination unit 108 (see FIG. 2) determines that at least one of remaining distance and approach speed and time to reach the current object A (see FIG. 3) is outside the range of at least one of remaining distance and approach speed and time to reach the reference object and the current low beam emission amount corresponding to the current brightness information is outside the range of the reference high beam emission amount that corresponds to the range of reference brightness information, the adjusting of the brightness level (operation S606*b*) may include increasing a level of the current low beam emission amount that corresponds to the current brightness information of the lamp 10 (see FIG. 2) under control of the control unit 106 (see FIG. 2) so as to emit light by adjusting the current low beam emission amount to the range of the reference high beam emission amount, wherein the increasing is performed by the brightness level adjustment unit 110 (see FIG. 2).

In another embodiment, as illustrated in FIG. 7, when the determination unit 108 (see FIG. 2) determines that at least one of remaining distance and approach speed and time to reach the current object A (see FIG. 4) is within the range of at least one of remaining distance and approach speed and time to reach the reference object and the brightness area S1 (see FIG. 3) of the current road surface B (see FIG. 3) that corresponds to the current brightness information is outside the range of the first brightness area of the reference road surface that corresponds to the range of reference brightness information, the adjusting of the brightness level (operation S706*a*) may include decreasing the brightness area S2 (see FIG. 4) of the current road surface B (see FIG. 4) which corresponds to the current brightness information of the lamp 10 (see FIGS. 1 and 2) under control of the control unit 106 (see FIG. 2) so as to display the brightness area S1 (see FIG. 3) of the current road surface B (see FIG. 3) to be adjusted to the range of the first brightness area of the reference road surface, wherein the decreasing is performed by the brightness level adjustment unit 110 (see FIG. 2).

On the other hand, as illustrated in FIG. 7, when the determination unit 108 (see FIG. 2) determines that at least one of remaining distance and approach speed and time to reach the current object A (see FIG. 3) is outside the range of at least one of remaining distance and approach speed and time to reach the reference object and the brightness area S2 (see FIG. 4) of the current road surface B (see FIG. 4) that corresponds to the current brightness information is outside the range of the second brightness area of the reference road surface that corresponds to the range of reference brightness information, the adjusting of the brightness level (operation S706*b*) may include increasing the brightness area S1 (see FIG. 3) of the current road surface B (see FIG. 3) which corresponds to the current brightness information of the lamp 10 (see FIGS. 1 and 2) under control of the control unit 106 (see FIG. 2) so as to display the brightness area S2 (see FIG. 4) of the current road surface B (see FIG. 4) to be adjusted to the range of the second brightness area of the reference road surface, wherein the increasing is performed by the brightness level adjustment unit 110 (see FIG. 2).

As such, the apparatus 100 according to the first embodiment of the present invention includes the first sensing unit 102, the second sensing unit 104, the control unit 106, the determination unit 108, and the brightness level adjustment unit 110 and, according to the method 500, 600 or 700 of controlling a lamp for vehicles, the sensing (operation S502, S602 or S702), the determining (operation S504, S604 or S704), and the adjusting of the brightness level (operation S506, S606 or S706) are performed.

Thus, according to the apparatus 100 according to the first embodiment of the present invention and the method 500, 600 or 700 of controlling a lamp for vehicles, a current brightness level state of the lamp 10 may be efficiently adjusted according to information regarding approaching to at least one of a preceding vehicle corresponding to the current object A (see FIGS. 3 and 4) and an oncoming vehicle in the opposite lane when one's own vehicle is running, and thus, driving efficiency may be enhanced and glare of the lamp 10 to at least one of a driver of a preceding vehicle and a driver of an oncoming vehicle in the opposite lane may be inhibited, whereby traffic accidents may be prevented.

Figure 8:
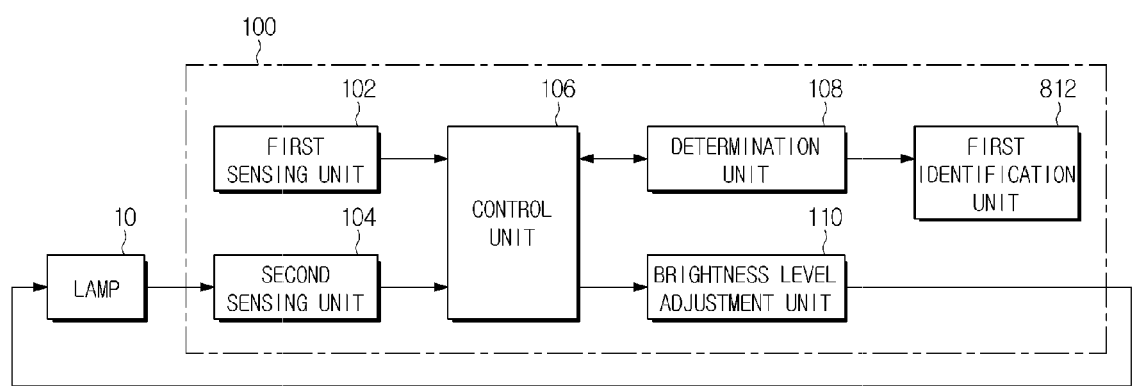
FIG. 8 is a block diagram of an apparatus for controlling a lamp for vehicles according to a second embodiment of the present invention.

FIG. 8 is a block diagram of an apparatus 800 for controlling a lamp for vehicles according to a second embodiment of the present invention.

Referring to FIG. 8, the apparatus 800 according to the second embodiment of the present invention includes the same elements as those of the apparatus 100 (see FIGS. 1 and 2) according to the first embodiment of the present invention, i.e., the first sensing unit 102, the second sensing unit 104, the control unit 106, the determination unit 108, and the brightness level adjustment unit 110.

Function of each element constituting the apparatus 800 according to the second embodiment of the present invention and a connection relationship among the elements are the same as those of the apparatus 100 (see FIGS. 1 and 2) according to the first embodiment of the present invention and a detailed description thereof will thus be omitted herein.

In the present embodiment, the apparatus 800 may further include a first identification unit 812.

That is, the first identification unit 812 is provided to identify a level state of current brightness information when the determination unit 108 determines that information regarding approaching to the current object A (see FIGS. 3 and 4) is within the range of information regarding approaching to a reference object and the current brightness information is outside the range of reference brightness information.

In an embodiment, when the determination unit 108 determines that at least one of remaining distance and approach speed and time to reach the current object A (see FIG. 4) is within the range of at least one of remaining distance and approach speed and time to reach the reference object and the current high beam emission amount corresponding to the current brightness information is outside the range of the reference low beam emission amount that corresponds to the range of reference brightness information, the first identification unit 812 may identify a level state of the current high beam emission amount.

On the other hand, when the determination unit 108 determines that at least one of remaining distance and approach speed and time to reach the current object A (see FIG. 3) is outside the range of at least one of remaining distance and approach speed and time to reach the reference object and the current low beam emission amount corresponding to the current brightness information is outside the range of the reference high beam emission amount that corresponds to the range of reference brightness information, the first identification unit 812 may identify a level state of the current low beam emission amount.

In another embodiment, when the determination unit 108 determines that at least one of remaining distance and approach speed and time to reach the current object A (see FIG. 4) is within the range of at least one of remaining distance and approach speed and time to reach the reference object and the brightness area S1 (see FIG. 3) of the current road surface B (see FIG. 3) that corresponds to the current brightness information is outside the range of the first brightness area of the reference road surface that corresponds to the range of reference brightness information, the first identification unit 812 may identify a state of the brightness area S2 (see FIG. 4) of the current road surface B (see FIG. 4).

On the other hand, when the determination unit 108 determines that at least one of remaining distance and approach speed and time to reach the current object A (see FIG. 3) is outside the range of at least one of remaining distance and approach speed and time to reach the reference object and the brightness area S2 (see FIG. 4) of the current road surface B (see FIG. 4) that corresponds to the current brightness information is outside the range of the second brightness area of the reference road surface that corresponds to the range of reference brightness information, the first identification unit 812 may identify a state of the brightness area S1 (see FIG. 3) of the current road surface B (see FIG. 3).

In this regard, although now shown, the first identification unit 812 may include at least one of an alarm (not shown), a speaker (not shown), and a light emitting member (not shown) that are provided to allow a driver to identify information or conditions of a vehicle and at least one of a human machine interface (HMI) module (not shown) and a head-up display (HUD) module (not shown) that are mounted to allow a driver to identify information or conditions of a vehicle through interface between a user and a machine. Through such configuration, the first identification unit 812 may identify a level state of current brightness information through at least one operation selected from among alarm operation of the alarm (not shown), voice operation of the speaker (not shown), light emitting operation of the light emitting member (not shown), HMI message display operation of the HMI module (not shown), and HUD message display operation of the HUD module (not shown).

Hereinafter, a method of controlling the lamp 10 for vehicles using the apparatus 800 according to the second embodiment of the present invention will be described with reference to FIGS. 9 to 11.

Figure 9:
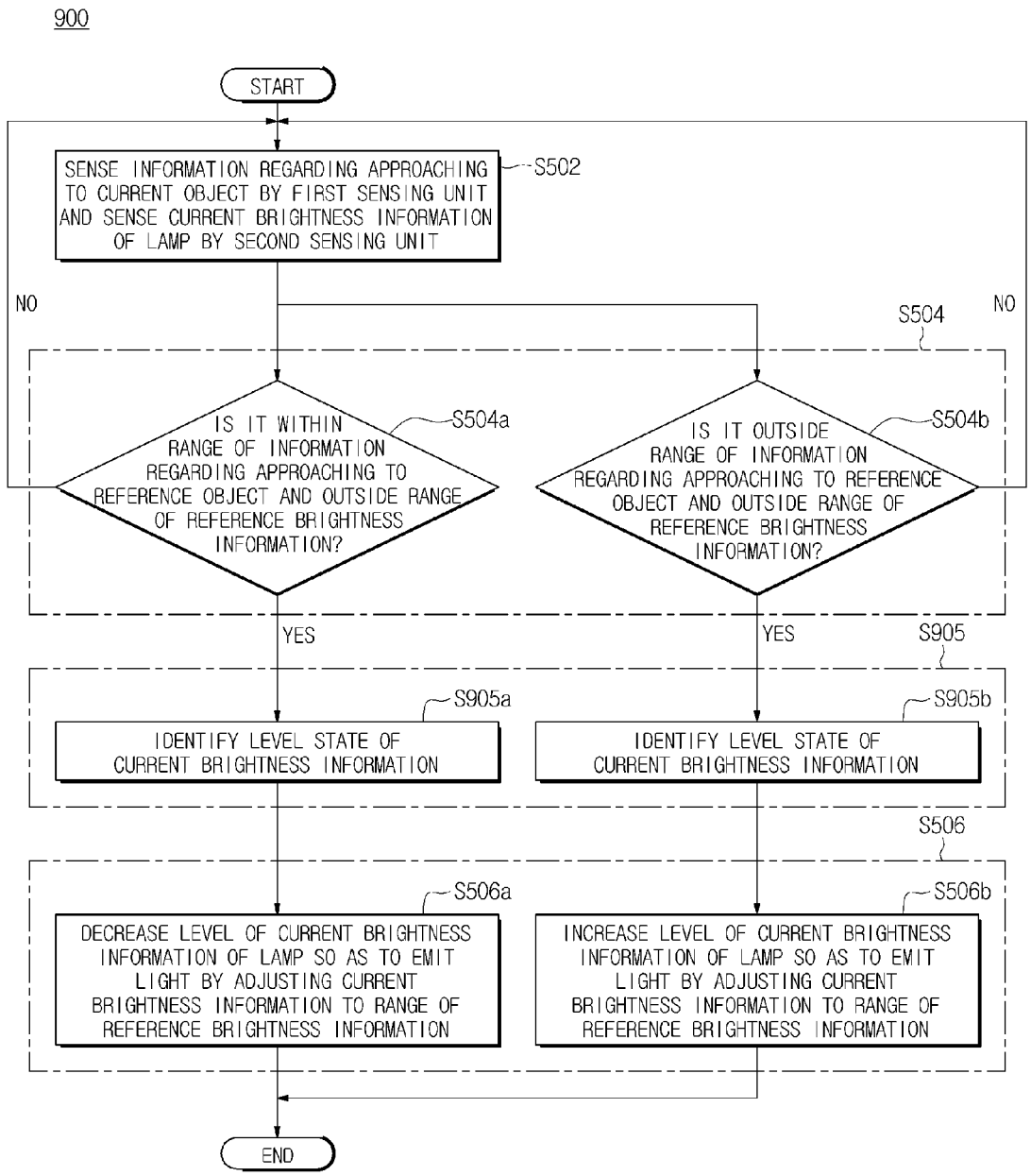
FIG. 9 is a flowchart illustrating a method of controlling a lamp for vehicles using the apparatus according to the second embodiment of the present invention.

FIG. 9 is a flowchart illustrating a method of controlling a lamp for vehicles using the apparatus 800 according to the second embodiment of the present invention. FIG. 10 is a flowchart illustrating an example of the method of controlling a lamp for vehicles using the apparatus 800 according to the second embodiment of the present invention.

Figure 11:
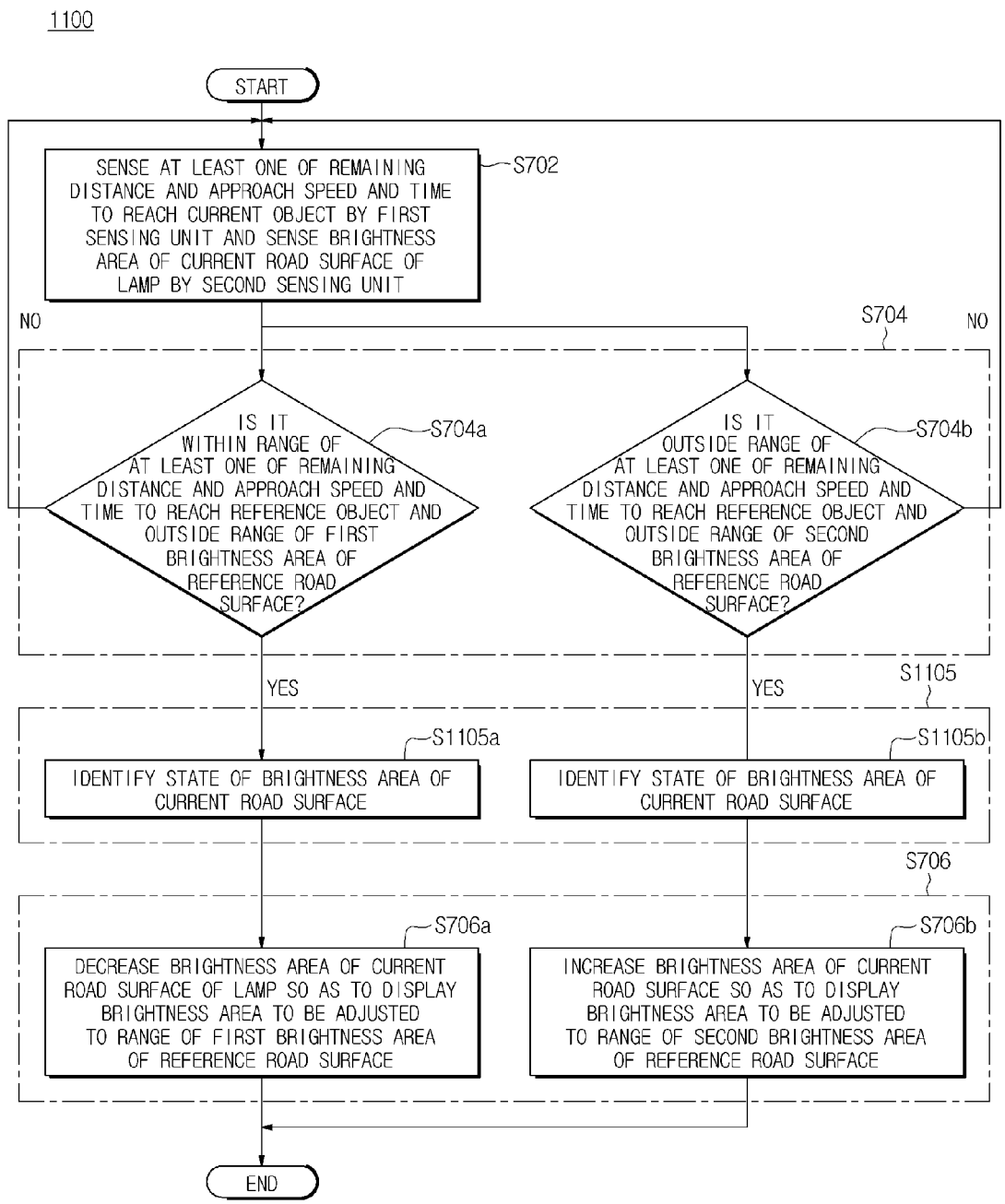
FIG. 11 is a flowchart illustrating another example of the method of controlling a lamp for vehicles using the apparatus according to the second embodiment of the present invention.

FIG. 11 is a flowchart illustrating another example of the method of controlling a lamp for vehicles using the apparatus 800 according to the second embodiment of the present invention.

Figure 10:
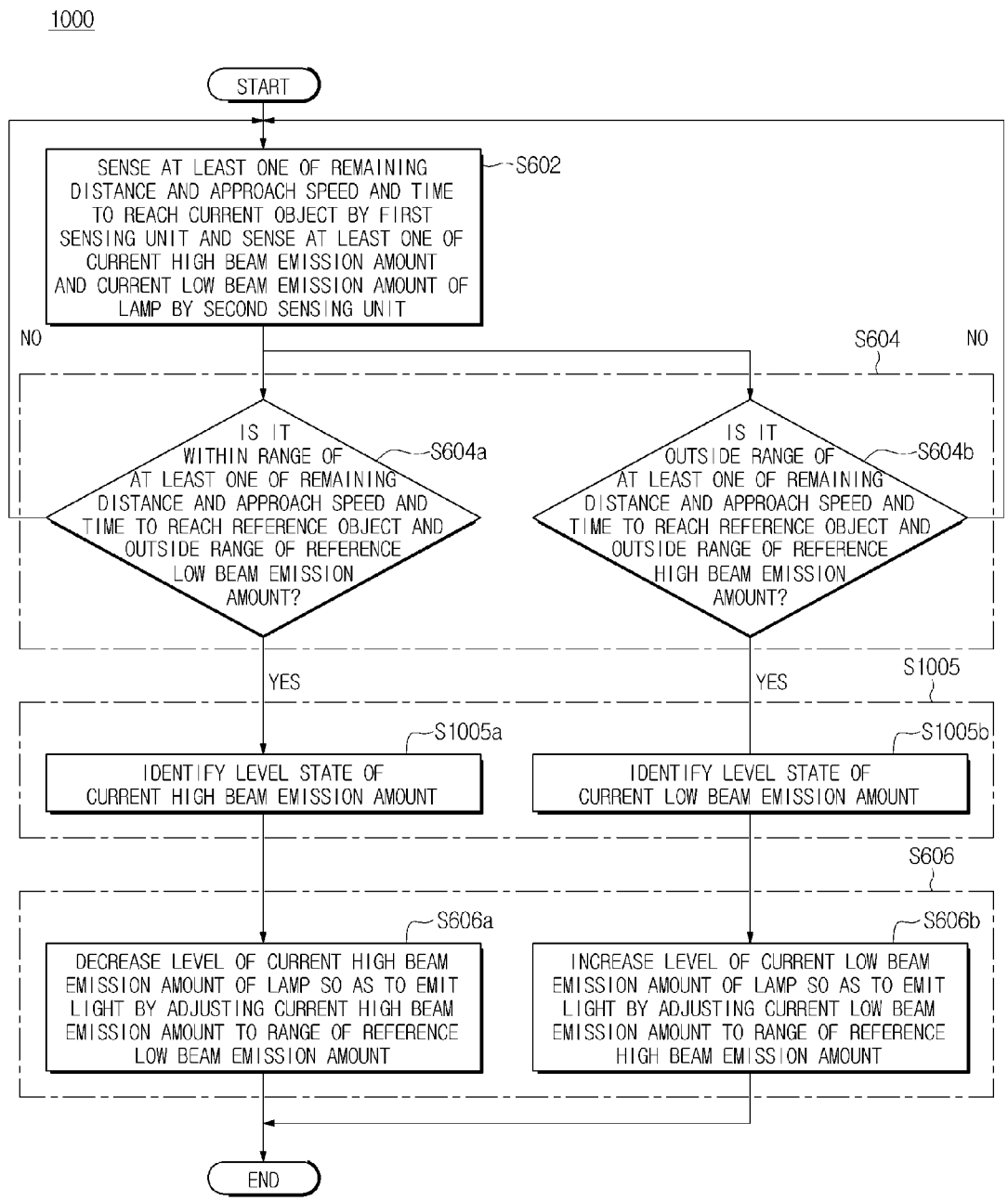
FIG. 10 is a flowchart illustrating an example of the method of controlling a lamp for vehicles using the apparatus according to the second embodiment of the present invention.

Referring to FIGS. 9 to 11, the method (operation 900, 1000 or 1100) of controlling a lamp for vehicles using the apparatus 800 (see FIG. 8) according to the second embodiment of the present invention includes the same operations as those of the method 500, 600 or 700 of controlling a lamp for vehicles using the apparatus 100 (see FIGS. 1 and 2) according to the first embodiment, i.e., sensing (operation S502, S602 or S702), determining (operation S504, S604 or S704), and adjusting a brightness level (operation S506, S606 or S706).

Function of each operation included in the method 900, 1000 or 1100 of controlling a lamp for vehicles using the apparatus 800 (see FIG. 8) according to the second embodiment of the present invention and a connection relationship among the operations are the same as those of the method 500, 600 or 700 of controlling a lamp for vehicles using the apparatus 100 (see FIGS. 1 and 2) according to the first embodiment and a detailed description thereof will thus be omitted herein.

In the present embodiments, the methods 900, 1000 and 1100 of controlling a lamp for vehicles using the apparatus 800 (see FIG. 8) according to the second embodiment of the present invention further include performing first identification (operations S905, S1005 and S1105, respectively) after the determining (operations S504, S604 and S704, respectively).

In an embodiment, the methods 900, 1000 and 1100 of controlling a lamp for vehicles using the apparatus 800 (see FIG. 8) according to the second embodiment of the present invention further include performing first identification (operations S905, S1005 and S1105, respectively) between determining (operations S504, S604 and S704, respectively) and adjusting a brightness level (operations S506, S606 and S706, respectively).

In another embodiment, although not shown in the drawings, the method 900, 1000 or 1100 of controlling a lamp for vehicles using the apparatus 800 (see FIG. 8) according to the second embodiment of the present invention may further include performing first identification (not shown) in synchronization with determining (not shown).

That is, when the determination unit 108 (see FIG. 8) determines that information regarding approaching to the current object A (see FIGS. 3 and 4) is within the range of information regarding approaching to a reference object and the current brightness information is outside the range of reference brightness information, the performing of the first identification (operations S905$a$ and S905$b$) includes identifying a level state of the current brightness information, wherein the identifying is performed by the first identification unit 812 (see FIG. 8).

In an embodiment, as illustrated in FIG. 10, when the determination unit 108 (see FIG. 8) determines that at least one of remaining distance and approach speed and time to reach the current object A (see FIG. 4) is within the range of at least one of remaining distance and approach speed and time to reach the reference object and the current high beam emission amount corresponding to the current brightness information is outside the range of the reference low beam emission amount that corresponds to the range of reference brightness information, the performing of the first identification (operation S1005$a$) may include identifying a level state of the current high beam emission amount, wherein the identifying is performed by the first identification unit 812 (see FIG. 8).

On the other hand, as illustrated in FIG. 10, when the determination unit 108 (see FIG. 8) determines that at least one of remaining distance and approach speed and time to reach the current object A (see FIG. 3) is outside the range of at least one of remaining distance and approach speed and time to reach the reference object and the current low beam emission amount is outside the range of the reference high beam emission amount that corresponds to the range of reference brightness information, the performing of the first identification (operation S1005$b$) may include identifying a level state of the current low beam emission amount, wherein the identifying is performed by the first identification unit 812 (see FIG. 8).

In another embodiment, as illustrated in FIG. 11, when the determination unit 108 (see FIG. 8) determines that at least one of remaining distance and approach speed and time to reach the current object A (see FIG. 4) is within the range of at least one of remaining distance and approach speed and time to reach the reference object and the brightness area S1 (see FIG. 3) of the current road surface B (see FIG. 3) that corresponds to the current brightness information is outside the range of the first brightness area of the reference road surface that corresponds to the range of reference brightness information, the performing of the first identification (operation S1105a) may include identifying a state of the brightness area S2 (see FIG. 4) of the current road surface B (see FIG. 4), wherein the identifying is performed by the first identification unit 812 (see FIG. 8).

On the other hand, as illustrated in FIG. 11, when the determination unit 108 (see FIG. 8) determines that at least one of remaining distance and approach speed and time to reach the current object A (see FIG. 3) is outside the range of at least one of remaining distance and approach speed and time to reach the reference object and the brightness area S2 (see FIG. 4) of the current road surface B (see FIG. 4) that corresponds to the current brightness information is outside the range of the second brightness area of the reference road surface that corresponds to the range of reference brightness information, the performing of the first identification (operation S1105b) may include identifying a state of the brightness area S1 (see FIG. 3) of the current road surface B (see FIG. 3), wherein the identifying is performed by the first identification unit 812 (see FIG. 8).

As such, the apparatus 800 according to the second embodiment of the present invention includes the first sensing unit 102, the second sensing unit 104, the control unit 106, the determination unit 108, the first identification unit 812, and the brightness level adjustment unit 110 and, according to the method 900, 1000 or 1100, the sensing (operation S502, S602 or S702), the determining (operation S504, S604 or S704), the performing of the first identification (operation S905, S1005 or S1105), and the adjusting of the brightness level (operation S506, S606 or S706) are performed.

Thus, according to the apparatus 800 according to the second embodiment of the present invention and the method 900, 1000 or 1100 of controlling a lamp for vehicles, a current brightness level state of the lamp 10 may be efficiently adjusted according to information regarding approaching to at least one of a preceding vehicle corresponding to the current object A (see FIGS. 3 and 4) and an oncoming vehicle in the opposite lane when one's own vehicle is running, and thus, driving efficiency may be enhanced and glare of the lamp 10 to at least one of a driver of a preceding vehicle and a driver of an oncoming vehicle in the opposite lane may be inhibited, whereby traffic accidents may be prevented.

In addition, according to the apparatus 800 according to the second embodiment of the present invention and the method 900, 1000 or 1100 of controlling a lamp for vehicles, the level state of current brightness information may be identified when it is determined that information regarding approaching to the current object A (see FIGS. 3 and 4) is within the range of information regarding approaching to a reference object and the current brightness information is outside the range of reference brightness information.

Thus, according to the apparatus 800 according to the second embodiment of the present invention and the method 900, 1000 or 1100 of controlling a lamp for vehicles, a driver may recognize the level state of current brightness information, which encourages the driver to carefully drive, whereby traffic accidents may be prevented.

Figure 12:
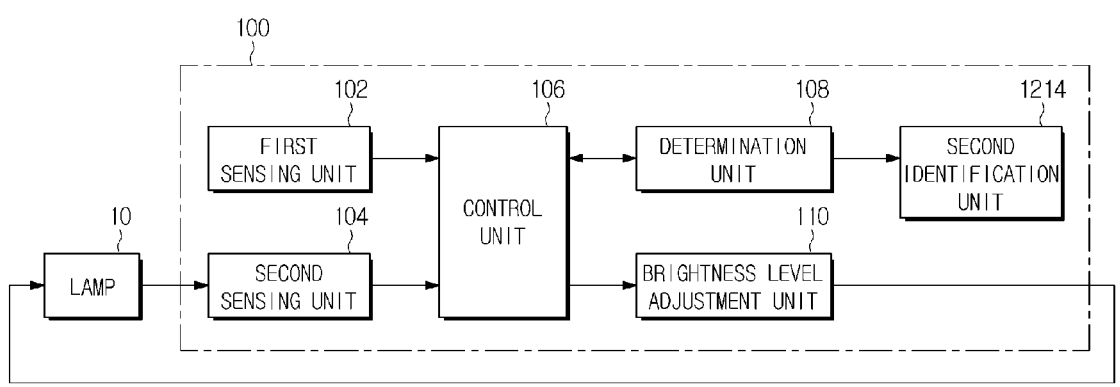
FIG. 12 is a block diagram of an apparatus for controlling a lamp for vehicles according to a third embodiment of the present invention.

FIG. 12 is a block diagram of an apparatus 1200 for controlling a lamp for vehicles according to a third embodiment of the present invention.

Referring to FIG. 12, the apparatus 1200 according to the third embodiment of the present invention includes the same elements as those of the apparatus 100 (see FIGS. 1 and 2) according to the first embodiment of the present invention, i.e., the first sensing unit 102, the second sensing unit 104, the control unit 106, the determination unit 108, and the brightness level adjustment unit 110.

Function of each element constituting the apparatus 1200 according to the third embodiment of the present invention and a connection relationship among the elements are the same as those of the apparatus 100 (see FIGS. 1 and 2) according to the first embodiment of the present invention and a detailed description thereof will thus be omitted herein.

In the present embodiment, the apparatus 1200 further includes a second identification unit 1214.

That is, the second identification unit 1214 is provided to identify adjustment of a level of current brightness information, when the determination unit 108 determines that information regarding approaching to the current object A (see FIGS. 3 and 4) is within the range of information regarding approaching to a reference object and the current brightness information is outside the range of reference brightness information.

In an embodiment, when the determination unit 108 determines that at least one of remaining distance and approach speed and time to reach the current object A (see FIG. 4) is within the range of at least one of remaining distance and approach speed and time to reach the reference object and the current high beam emission amount corresponding to the current brightness information is outside the range of the reference low beam emission amount that corresponds to the range of reference brightness information, the second identification unit 1214 may identify decrease of a level of the current high beam emission amount.

On the other hand, when the determination unit 108 determines that at least one of remaining distance and approach speed and time to reach the current object A (see FIG. 3) is outside the range of at least one of remaining distance and approach speed and time to reach the reference object and the current low beam emission amount that corresponds to the current brightness information is outside the range of the reference high beam emission amount that corresponds to the range of reference brightness information, the second identification unit 1214 may identify increase of a level of the current low beam emission amount.

In another embodiment, when the determination unit 108 determines that at least one of remaining distance and approach speed and time to reach the current object A (see FIG. 4) is within the range of at least one of remaining distance and approach speed and time to reach the reference object and the brightness area S1 (see FIG. 3) of the current road surface B (see FIG. 3) that corresponds to the current brightness information is outside the range of the first brightness area of the reference road surface that corresponds to the range of reference brightness information, the second identification unit 1214 may identify decrease of the brightness area S2 (see FIG. 4) of the current road surface B (see FIG. 4).

On the other hand, when the determination unit 108 determines that at least one of remaining distance and approach speed and time to reach the current object A (see FIG. 3) is outside the range of at least one of distance remaining distance and approach speed and time to reach the reference object and the brightness area S2 (see FIG. 4) of the current road surface B (see FIG. 4) that corresponds to the current brightness information is outside the range of the second brightness area of the reference road surface that corresponds to the range of reference brightness information, the second identification unit 1214 may identify increase of the brightness area S1 (see FIG. 3) of the current road surface B (see FIG. 3).

In this regard, although not shown in the drawings, the second identification unit 1214 may include at least one of an alarm (not shown), a speaker (not shown), and a light emitting member (not shown) that are provided to allow a driver to identify information or conditions of a vehicle and at least one of a HMI module (not shown) and a HUD module (not shown) that are mounted to allow a driver to identify information or conditions of a vehicle through interface between a user and a machine. Through such configuration, the second identification unit 1214 may identify adjustment of a level of current brightness information through at least one operation selected from among alarm operation of the alarm (not shown), voice operation of the speaker (not shown), light emitting operation of the light emitting member (not shown), HMI message display operation of the HMI module (not shown), and HUD message display operation of the HUD module (not shown).

Hereinafter, a method of controlling the lamp 10 for vehicles using the apparatus 1200 according to the third embodiment of the present invention will be described with reference to FIGS. 13 to 15.

Figure 13:
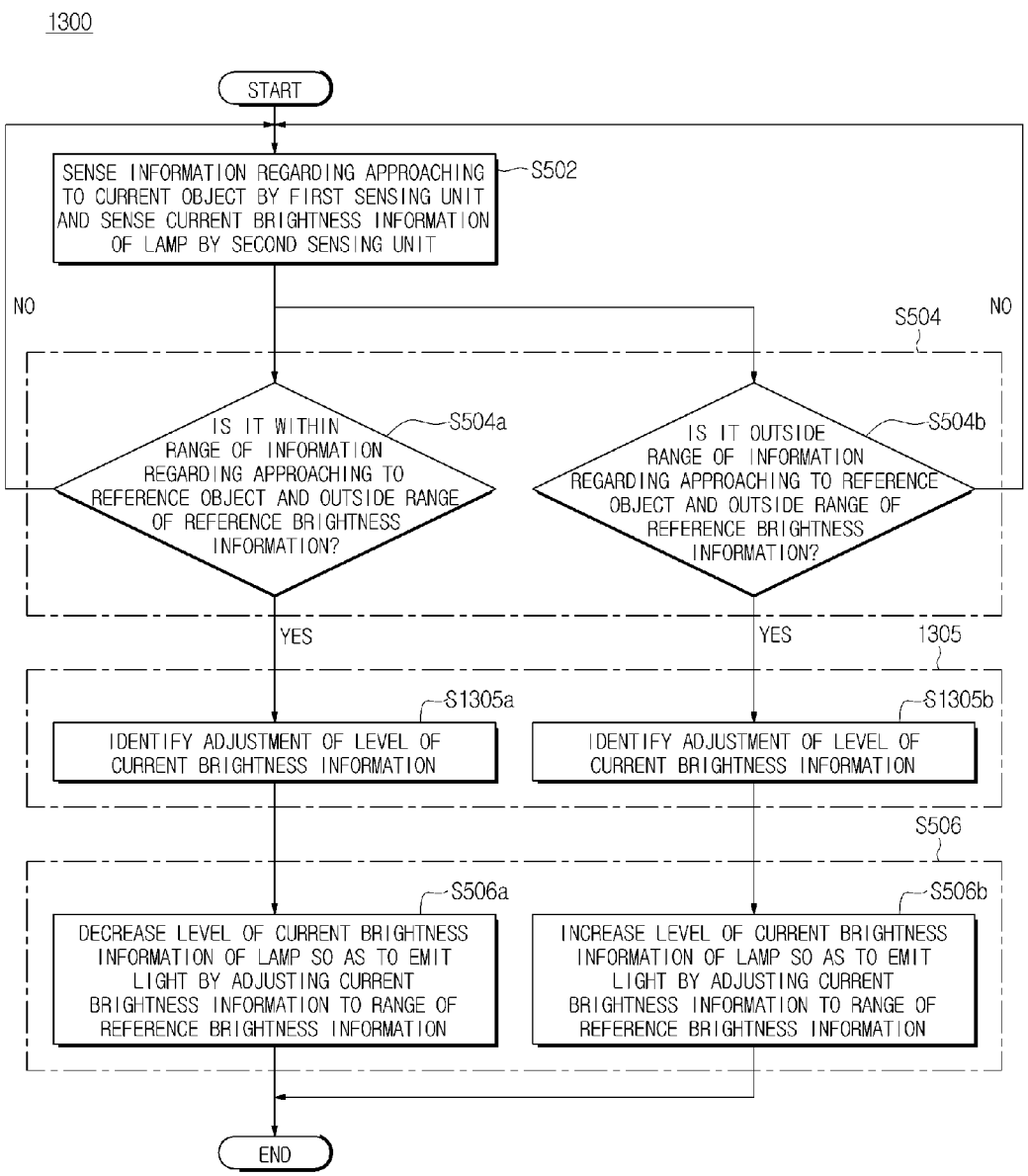
FIG. 13 is a flowchart illustrating a method of controlling a lamp for vehicles using the apparatus according to the third embodiment of the present invention.

FIG. 13 is a flowchart illustrating a method of controlling a lamp for vehicles using the apparatus 1200 according to the third embodiment of the present invention. FIG. 14 is a flowchart illustrating an example of the method of controlling a lamp for vehicles using the apparatus 1200 according to the third embodiment of the present invention.

Figure 15:
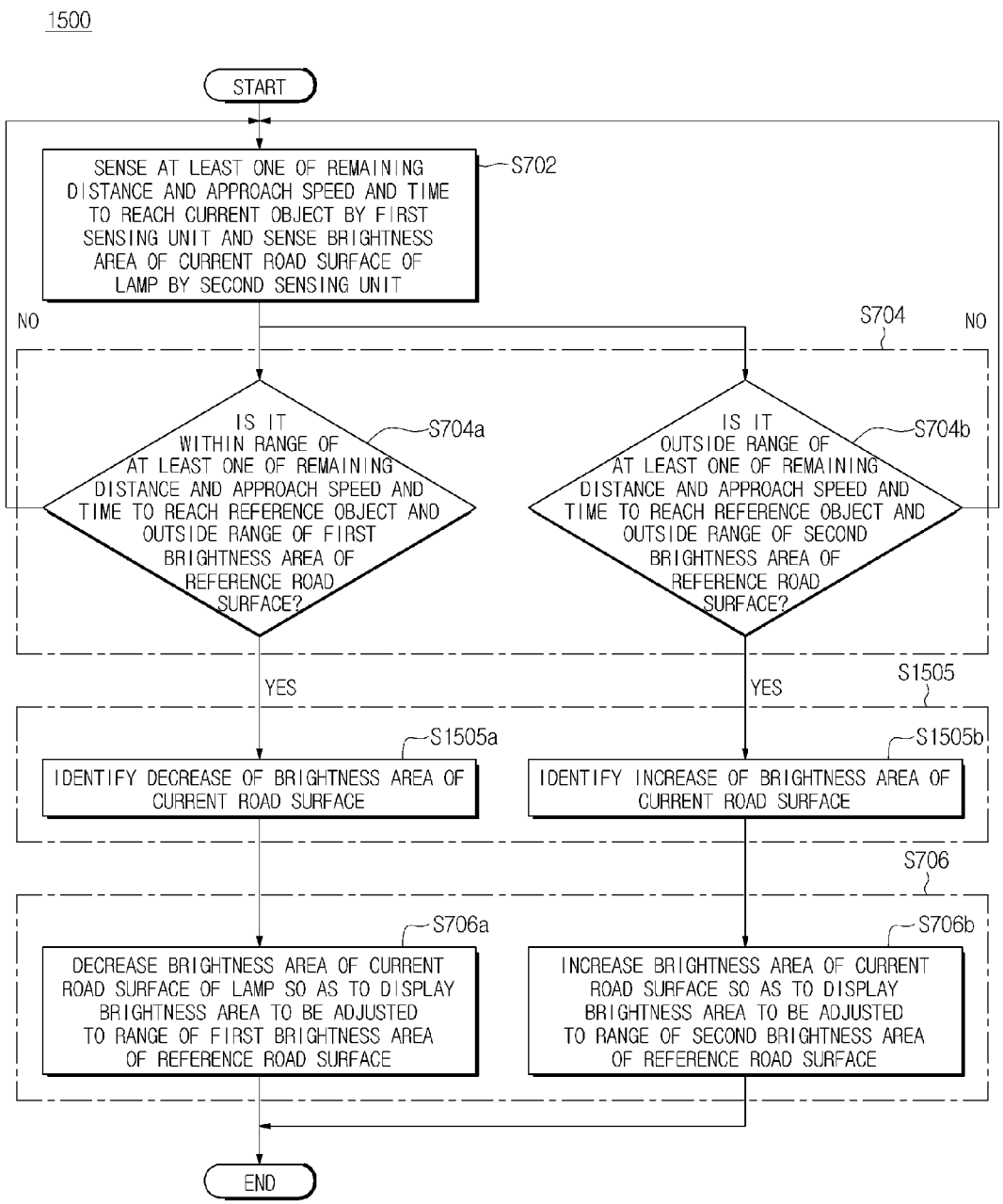
FIG. 15 is a flowchart illustrating another example of the method of controlling a lamp for vehicles using the apparatus according to the third embodiment of the present invention.

FIG. 15 is a flowchart illustrating another example of the method of controlling a lamp for vehicles using the apparatus 1200 according to the third embodiment of the present invention.

Figure 14:
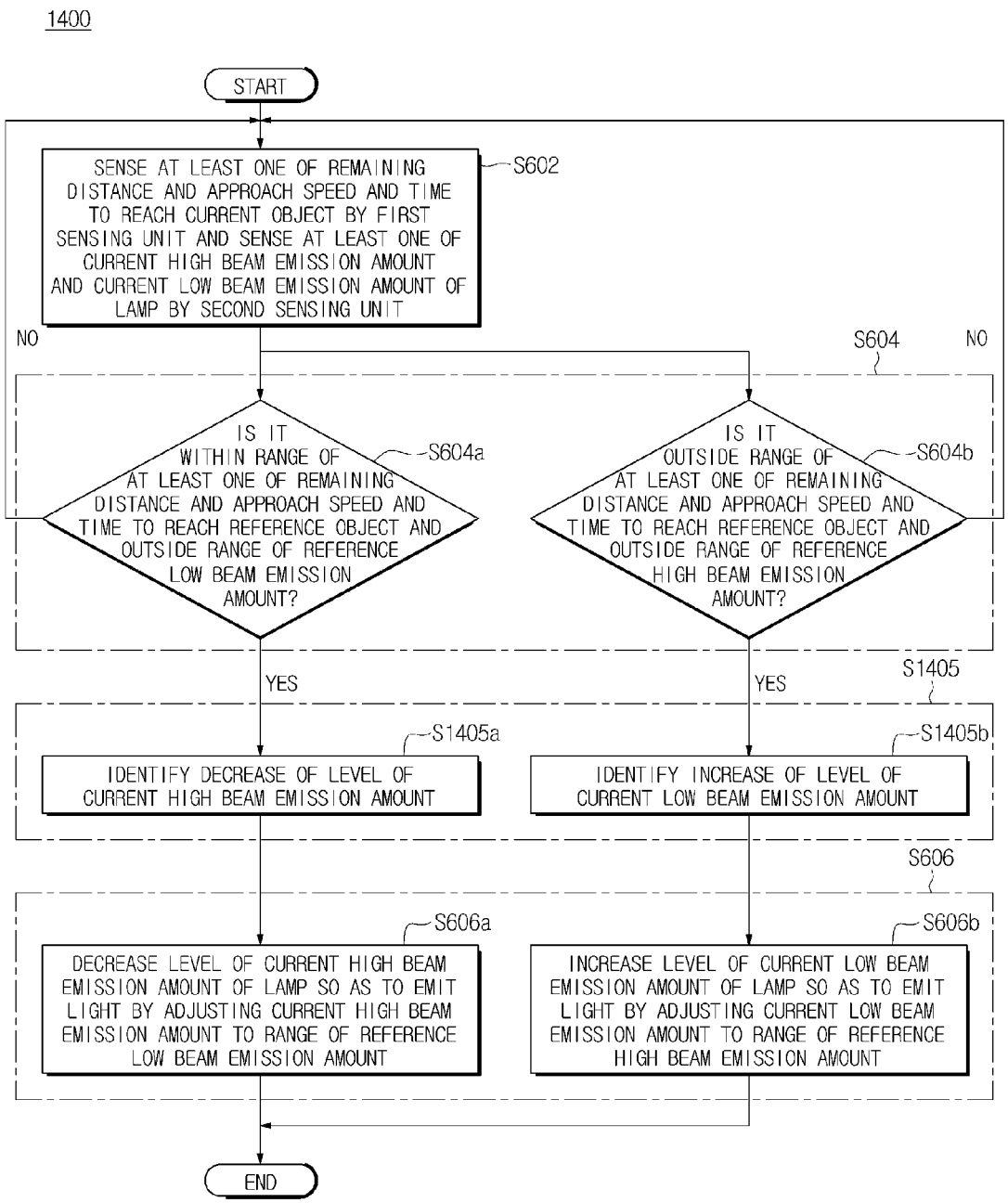
FIG. 14 is a flowchart illustrating an example of the method of controlling a lamp for vehicles using the apparatus according to the third embodiment of the present invention.

Referring to FIGS. 13 to 15, the method (operation 1300, 1400 or 1500) of controlling a lamp for vehicles using the apparatus 1200 (FIG. 12) according to the third embodiment of the present invention includes the same operations as those of the method (operation 500, 600 or 700) of controlling a lamp for vehicles using the apparatus 100 (FIGS. 1 and 2) according to the first embodiment, i.e., sensing (operation S502, S602 or S702), determining (operation S504, S604 or S704), and adjusting a brightness level (operation S506, S606 or S706).

Function of each operation included in the method 1300, 1400 or 1500 of controlling a lamp for vehicles using the apparatus 1200 (see FIG. 12) according to the third embodiment of the present invention and a connection relationship among the operations are the same as those of the method 500, 600 or 700 of controlling a lamp for vehicles using the apparatus 100 (see FIGS. 1 and 2) according to the first embodiment and a detailed description thereof will thus be omitted herein.

In the present embodiments, the methods 1300, 1400 and 1500 of controlling a lamp for vehicles using the apparatus 1200 (see FIG. 12) according to the third embodiment of the present invention further include performing second identification (operations S1305, S1405 and S1505, respectively) after the determining (operations S504, S604 and S704, respectively).

In an embodiment, the methods 1300, 1400 and 1500 of controlling a lamp for vehicles using the apparatus 1200 (see FIG. 12) according to the third embodiment of the present invention further include performing second identification (operations S1305, S1405 and S1505, respectively) between the determining (operations S504, S604 and S704, respectively) and the adjusting of the brightness level (operations S506, S606 and S706, respectively).

In another embodiment, although not shown in the drawings, the method 1300, 1400 or 1500 of controlling a lamp for vehicles using the apparatus 1200 (see FIG. 12) according to the third embodiment of the present invention may further include performing second identification (not shown) in synchronization with determining (not shown).

That is, when the determination unit 108 (see FIG. 12) determines that information regarding approaching to the current object A (see FIGS. 3 and 4) is within the range of information regarding approaching to a reference object and the current brightness information is outside the range of reference brightness information, the performing of the second identification (operations S1305a and S1305b) includes identifying adjustment of a level of the current brightness information, wherein the identifying is performed by the second identification unit 1214 (see FIG. 12).

In an embodiment, as illustrated in FIG. 14, when the determination unit 108 (see FIG. 12) determines that at least one of remaining distance and approach speed and time to reach the current object A (see FIG. 4) is within the range of at least one of remaining distance and approach speed and time to reach the reference object and the current high beam emission amount that corresponds to the current brightness information is outside the range of the reference low beam emission amount that corresponds to the range of reference brightness information, the performing of the second identification (operation S1405a) may include identifying decrease of a level of the current high beam emission amount, wherein the identifying is performed by the second identification unit 1214 (see FIG. 12).

On the other hand, as illustrated in FIG. 14, when the determination unit 108 (see FIG. 12) determines that at least one of remaining distance and approach speed and time to reach the current object A (see FIG. 3) is outside the range of at least one of remaining distance and approach speed and time to reach the reference object and the current low beam emission amount that corresponds to the current brightness information is outside the range of the reference high beam emission amount that corresponds to the range of reference brightness information, the performing of the second identification (operation S1405b) may include identifying increase of a level of the current low beam emission amount, wherein the identifying is performed by the second identification unit 1214 (see FIG. 12).

In another embodiment, as illustrated in FIG. 15, when the determination unit 108 (see FIG. 12) determines that at least one of remaining distance and approach speed and time to reach the current object A (see FIG. 4) is within the range of at least one of remaining distance and approach speed and time to reach the reference object and the brightness area S1 (see FIG. 3) of the current road surface B (see FIG. 3) that corresponds to current brightness information is outside the range of the first brightness area of the reference road surface that corresponds to the range of reference brightness information, the performing of the second identification (operation S1505a) may include identifying decrease of the brightness area S2 (see FIG. 4) of the current road surface B (see FIG. 4), wherein the identifying is performed by the second identification unit 1214 (see FIG. 12).

On the other hand, as illustrated in FIG. 15, when the determination unit 108 (see FIG. 12) determines that at least one of remaining distance and approach speed and time to reach the current object A (see FIG. 3) is outside the range of at least one of remaining distance and approach speed and time to reach the reference object and the brightness area S2 (see FIG. 4) of the current road surface B (see FIG. 4) that corresponds to the current brightness information is outside the range of the second brightness area of the reference road surface that corresponds to the range of reference brightness information, the performing of the second identification (operation S1505b) may include identifying increase of the brightness area S1 (see FIG. 3) of the current road surface B (see FIG. 3), wherein the identifying is performed by the second identification unit 1214 (see FIG. 12).

As such, the apparatus 1200 according to the third embodiment of the present invention includes the first sensing unit 102, the second sensing unit 104, the control unit 106, the determination unit 108, the second identification unit 1214, and the brightness level adjustment unit 110 and, according to the method 1300, 1400 or 1500, the sensing (operation S502, S602 or S702), the determining (operation S504, S604 or S704), the performing of the second identification (operation S1305, S1405 or S1505), and the adjusting of the brightness level (operation S506, S606 or S706) are performed.

Thus, according to the apparatus 1200 according to the third embodiment of the present invention and the method 1300, 1400 or 1500 of controlling a lamp for vehicles using the apparatus 1200, a current brightness level state of the lamp 10 may be efficiently adjusted according to information regarding approaching to at least one of a preceding vehicle corresponding to the current object A (see FIGS. 3 and 4) and an oncoming vehicle in the opposite lane when one's own vehicle is running, and thus, driving efficiency may be enhanced and glare of the lamp 10 to at least one of a driver of the preceding vehicle and a driver of the oncoming vehicle in the opposite lane may be inhibited, whereby traffic accidents may be prevented.

In addition, according to the apparatus 1200 according to the third embodiment of the present invention and the method 1300, 1400 or 1500 of controlling a lamp for vehicles using the apparatus 1200, adjustment of the level of current brightness information may be identified when it is determined that information regarding approaching to the current object A (see FIGS. 3 and 4) is within the range of information regarding approaching to a reference object and the current brightness information is outside the range of reference brightness information.

Thus, according to the apparatus 1200 according to the third embodiment of the present invention and the method 1300, 1400 or 1500 of controlling a lamp for vehicles using the apparatus 1200, a driver may recognize that the level of current brightness information is adjusted, which encourages the driver to carefully drive, whereby traffic accidents may be prevented.

Figure 16:
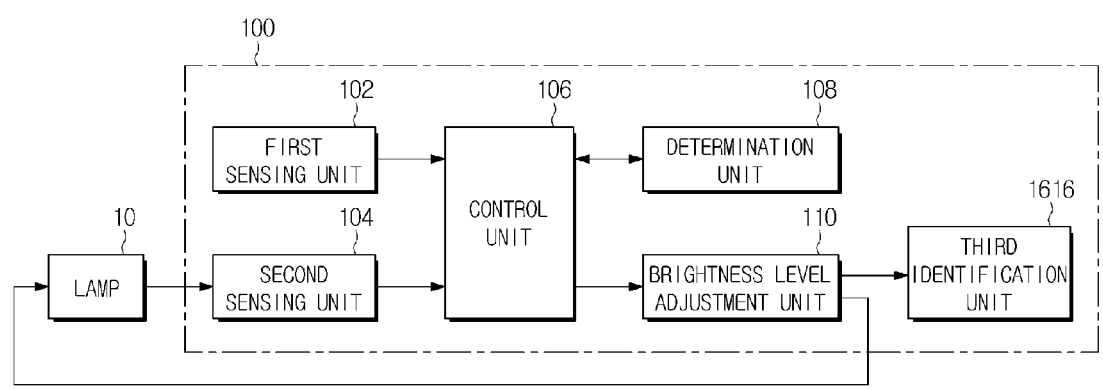
FIG. 16 is a block diagram of an apparatus for controlling a lamp for vehicles according to a fourth embodiment of the present invention.

FIG. 16 is a block diagram of an apparatus 1600 for controlling a lamp for vehicles according to a fourth embodiment of the present invention.

Referring to FIG. 16, the apparatus 1600 according to the fourth embodiment of the present invention includes the same elements as those of the apparatus 100 (see FIGS. 1 and 2) according to the first embodiment, i.e., the first sensing unit 102, the second sensing unit 104, the control unit 106, the determination unit 108, and the brightness level adjustment unit 110.

Function of each element constituting the apparatus 1600 according to the fourth embodiment of the present invention and a connection relationship among the elements are the same as those of the apparatus 100 (see FIGS. 1 and 2) according to the first embodiment and a detailed description thereof will thus be omitted herein.

In the present embodiment, the apparatus 1600 further includes a third identification unit 1616.

That is, the third identification unit 1616 is provided to identify that adjustment of a level of current brightness information is completed, when the brightness level adjustment unit 110 completes adjustment of the level of current brightness information of the lamp 10 under control of the control unit 106 so as to emit light by adjusting the current brightness information to the range of reference brightness information.

In an embodiment, when the brightness level adjustment unit 110 completes adjustment by decreasing a level of the current high beam emission amount that corresponds to the current brightness information of the lamp 10 under control of the control unit 106 so as to emit light by adjusting the current high beam emission amount to a range of a reference low beam emission amount, the third identification unit 1616 may identify that the level of the current high beam emission amount is decreased.

On the other hand, when the brightness level adjustment unit 110 completes adjustment by increasing a level of the current low beam emission amount that corresponds to the current brightness information of the lamp 10 under control of the control unit 106 so as to emit light by adjusting the current low beam emission amount to the range of the reference high beam emission amount, the third identification unit 1616 may identify that the level of the current low beam emission amount is increased.

In another embodiment, when the brightness level adjustment unit 110 completes adjustment by decreasing the brightness area S2 (see FIG. 4) of the current road surface B (see FIG. 4) that corresponds to the current brightness information of the lamp 10 under control of the control unit 106 so as to display the brightness area S1 (see FIG. 3) of the current road surface B (see FIG. 3) to be adjusted to the range of the first brightness area of the reference road surface, the third identification unit 1616 may identify that the brightness area S2 (see FIG. 4) of the current road surface B (see FIG. 4) is decreased.

On the other hand, when the brightness level adjustment unit 110 completes adjustment by increasing the brightness area S2 (see FIG. 4) of the current road surface B (see FIG. 4) that corresponds to the current brightness information of the lamp 10 under control of the control unit 106 so as to display the brightness area S2 (see FIG. 4) of the current road surface B (see FIG. 4) to be adjusted to the range of the second brightness area of the reference road surface, the third identification unit 1616 may identify that the brightness area S2 (see FIG. 4) of the current road surface B (see FIG. 4) is increased.

In this regard, although not shown in the drawings, the third identification unit 1616 may include at least one of an alarm (not shown), a speaker (not shown), and a light emitting member (not shown) that are provided to allow a driver to identify information or conditions of a vehicle and at least one of a HMI module (not shown) and a HUD module (not shown) that are mounted to allow a driver to identify information or conditions of a vehicle through interface between a user and a machine. Through such configuration, the third identification unit 1616 may identify that adjustment of a level of current brightness information is completed through at least one operation selected from among alarm operation of the alarm (not shown), voice operation of the speaker (not shown), light emitting operation of the light emitting member (not shown), HMI message display operation of the HMI module (not shown), and HUD message display operation of the HUD module (not shown).

Hereinafter, a method of controlling the lamp 10 for vehicles using the apparatus 1600 according to the fourth embodiment of the present invention will be described in detail with reference to FIGS. 17 to 19.

Figure 17:
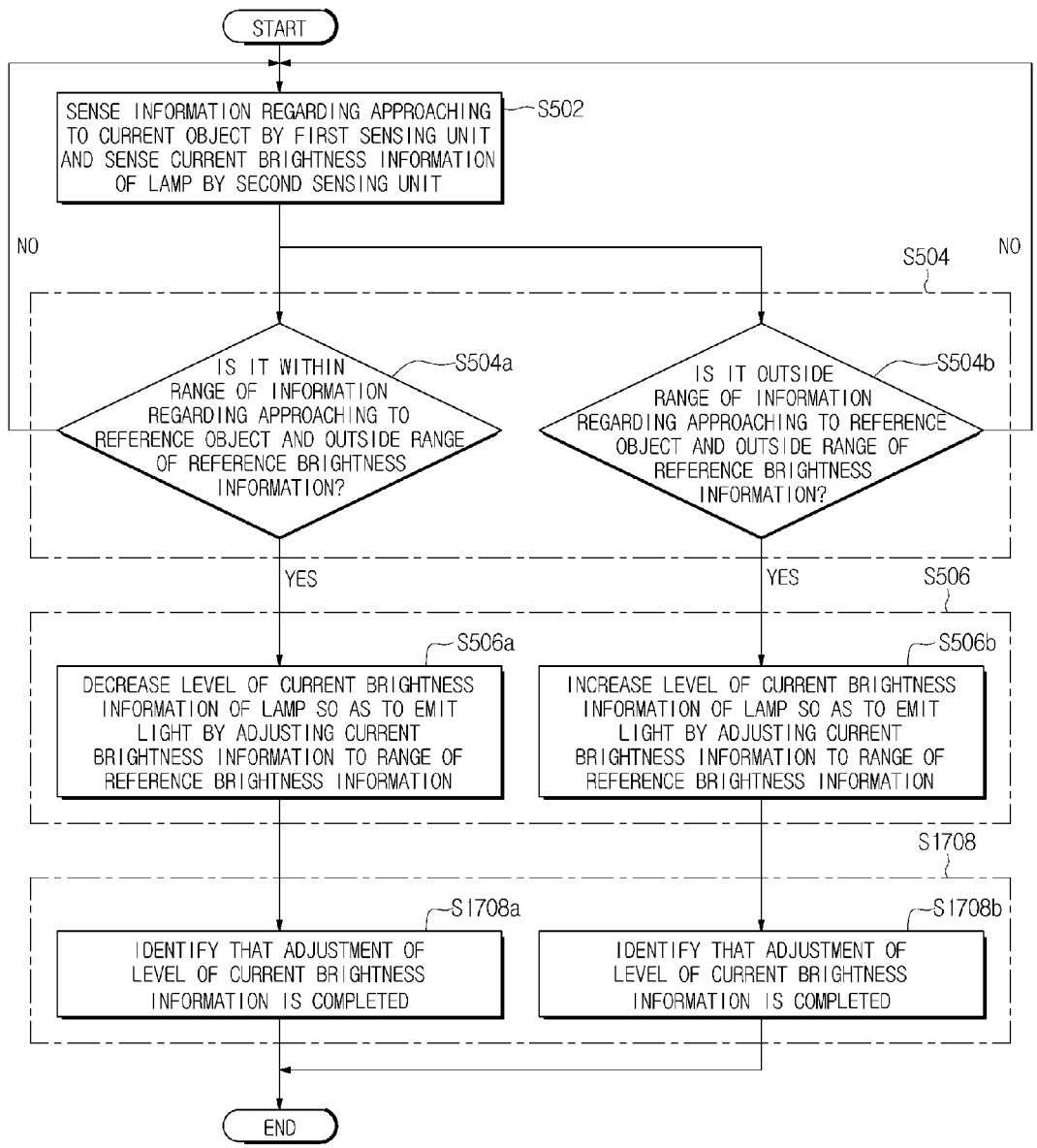
FIG. 17 is a flowchart illustrating a method of controlling a lamp for vehicles using the apparatus according to the fourth embodiment of the present invention.

FIG. 17 is a flowchart illustrating a method of controlling a lamp for vehicles using the apparatus 1600 according to the fourth embodiment of the present invention. FIG. 18 is a flowchart illustrating an example of the method of controlling a lamp for vehicles using the apparatus 1600 according to the fourth embodiment of the present invention.

Figure 19:
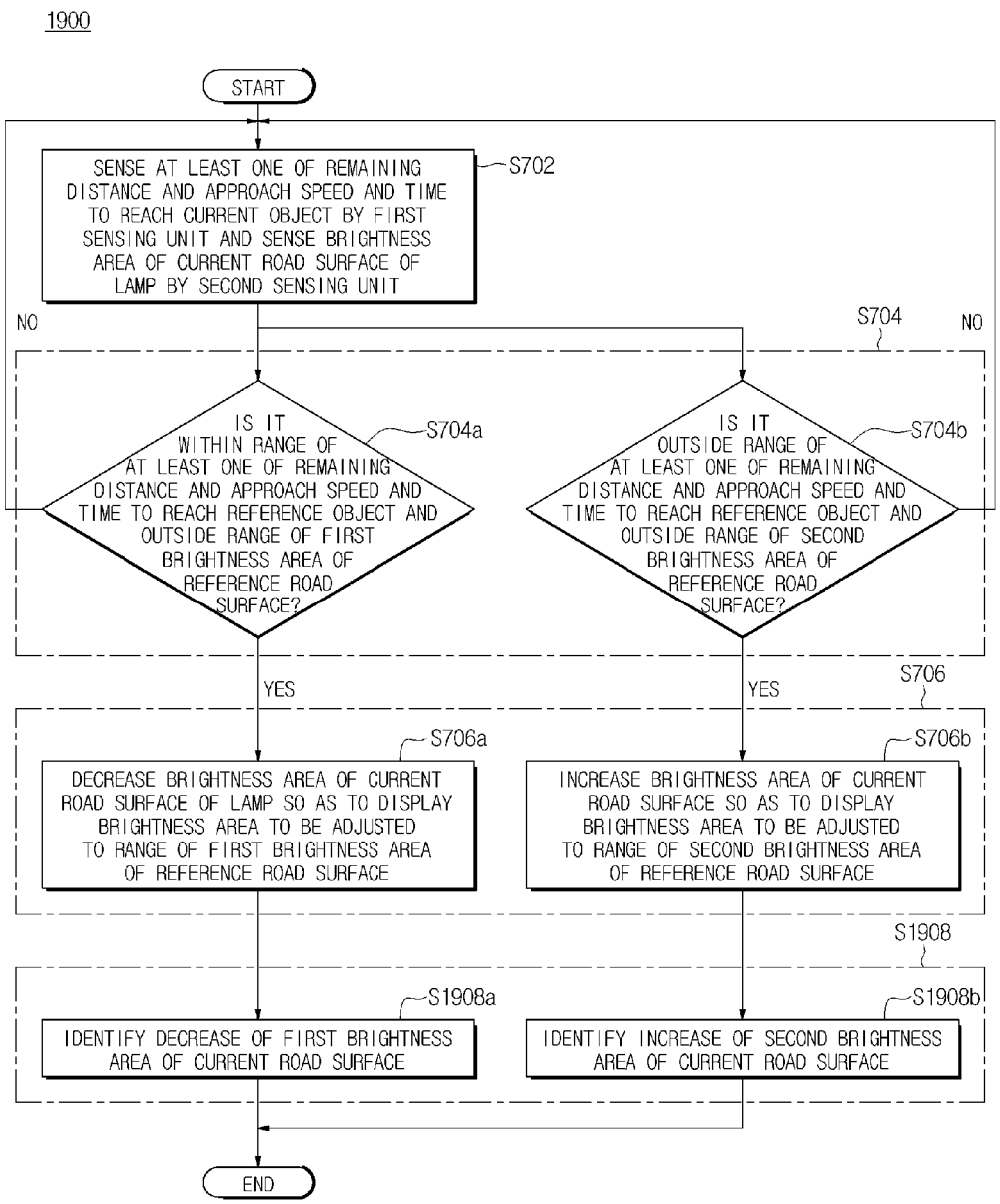
FIG. 19 is a flowchart illustrating another example of the method of controlling a lamp for vehicles using the apparatus according to the fourth embodiment of the present invention.

FIG. 19 is a flowchart illustrating another example of the method of controlling a lamp for vehicles using the apparatus 1600 according to the fourth embodiment of the present invention.

Figure 18:
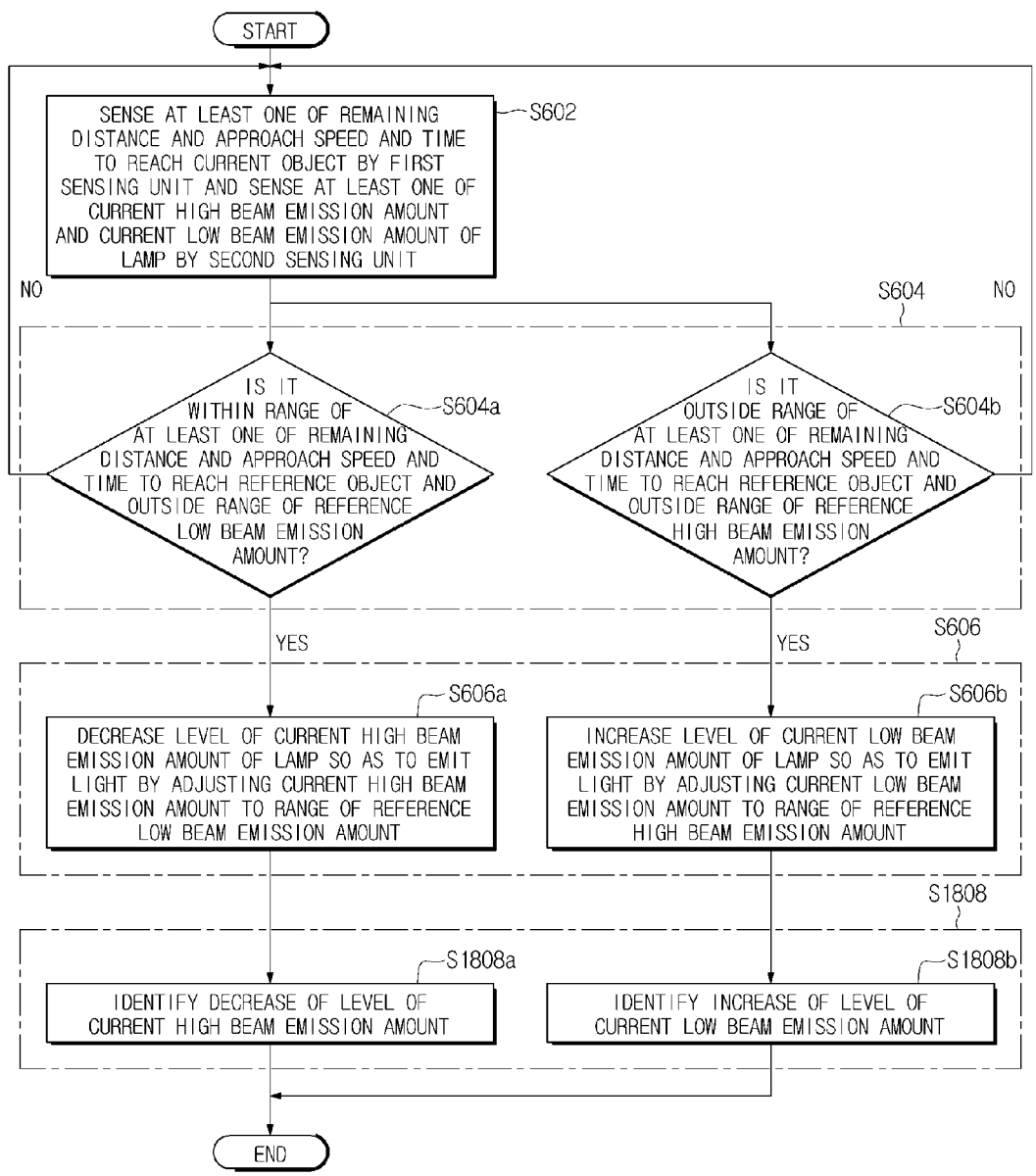
FIG. 18 is a flowchart illustrating an example of the method of controlling a lamp for vehicles using the apparatus according to the fourth embodiment of the present invention.

Referring to FIGS. 17 to 19, the method (operation 1700, 1800 or 1900) of controlling a lamp for vehicles using the apparatus 1600 (FIG. 16) according to the fourth embodiment of the present invention includes the same operations as those of the method (operation 500, 600 or 700) of controlling a lamp for vehicles using the apparatus 100 (FIGS. 1 and 2) according to the first embodiment, i.e., sensing (operation S502, S602 or S702), determining (operation S504, S604 or S704), and adjusting a brightness level (operation S506, S606 or S706).

Function of each operation included in the method 1700, 1800 or 1900 of controlling a lamp for vehicles using the apparatus 1600 (see FIG. 16) according to the fourth embodiment of the present invention and a connection relationship among the operations are the same as those of the method 500, 600 or 700 of controlling a lamp for vehicles using the apparatus 100 (see FIGS. 1 and 2) according to the first embodiment and a detailed description thereof will thus be omitted herein.

In the present embodiments, the methods 1700, 1800 and 1900 of controlling a lamp for vehicles using the apparatus 1600 (see FIG. 16) according to the fourth embodiment of the present invention further include performing third identification (operations S1708, S1808 and S1908, respectively) after the adjusting of the brightness level (operations S506, S606 and S706, respectively).

That is, the performing of the third identification (operations S1708a and S1708b) includes identifying that adjustment of a level of current brightness information is completed, when the brightness level adjustment unit 110 (see FIG. 16) completes adjustment of a level of current brightness information of the lamp 10 (see FIG. 16) under control of the control unit 106 (see FIG. 16) so as to emit light by adjusting the current brightness information to the range of reference brightness information.

In an embodiment, as illustrated in FIG. 18, when the brightness level adjustment unit 110 (see FIG. 16) completes adjustment by decreasing a level of the current high beam emission amount that corresponds to the current brightness information of the lamp 10 (see FIG. 16) under control of the control unit 106 (see FIG. 16) so as to emit light by adjusting the current high beam emission amount to the range of the reference low beam emission amount, the performing of the third identification (operation S1808a) may include identify that the level of the current high beam emission amount is decreased, wherein the identifying is performed by the third identification unit 1616 (see FIG. 16).

On the other hand, as illustrated in FIG. 18, when the brightness level adjustment unit 110 (see FIG. 16) completes adjustment by increasing a level of the current low beam emission amount that corresponds to the current brightness information of the lamp 10 (see FIG. 16) under control of the control unit 106 (see FIG. 16) so as to emit light by adjusting the current low beam emission amount to the range of the reference high beam emission amount, the performing of the third identification (operation S1808a) may include identify that the level of the current low beam emission amount is increased, wherein the identifying is performed by the third identification unit 1616 (see FIG. 16).

In another embodiment, as illustrated in FIG. 19, when the brightness level adjustment unit 110 (see FIG. 16) completes adjustment by decreasing the brightness area S2 (see FIG. 4) of the current road surface B (see FIG. 4) that corresponds to the current brightness information of the lamp 10 (see FIG. 16) under control of the control unit 106 (see FIG. 16) so as to display the brightness area S1 (see FIG. 3) of the current road surface B (see FIG. 3) to be adjusted to the range of the first brightness range of the reference road surface, the performing of the third identification (operation S1908a) may include identifying that the brightness area S2 (see FIG. 4) of the current road surface B (see FIG. 4) is decreased, wherein the identifying is performed by the third identification unit 1616 (see FIG. 16).

On the other hand, as illustrated in FIG. 19, when the brightness level adjustment unit 110 (see FIG. 16) completes adjustment by increasing the brightness area S2 (see FIG. 4) of the current road surface B (see FIG. 4) that corresponds to the current brightness information of the lamp 10 (see FIG. 16) under control of the control unit 106 (see FIG. 16) so as to display the brightness area S2 (see FIG. 4) of the current road surface B (see FIG. 4) to be adjusted to the range of the second brightness range of the reference road surface, the performing of the third identification (operation S1908b) may include identifying that the brightness area S2 (see FIG. 4) of the current road surface B (see FIG. 4) is increased, wherein the identifying is performed by the third identification unit 1616 (see FIG. 16).

As such, the apparatus 1600 according to the fourth embodiment of the present invention includes the first sensing unit 102, the second sensing unit 104, the control unit 106, the determination unit 108, the brightness level adjustment unit 110, and the third identification unit 1616 and, according to the method 1700, 1800 or 1900, the sensing (operation S502, S602 or S702), the determining (operation S504, S604 or S704), the adjusting of the brightness level (operation S506, S606 or S706), and the performing of the third identification (operation S1708, S1808 or S1908) are performed.

Thus, according to the apparatus 1600 according to the fourth embodiment of the present invention and the method 1700, 1800 or 1900 of controlling a lamp for vehicles using the apparatus 1600, a current brightness level state of the lamp 10 may be efficiently adjusted according to information regarding approaching to at least one of a preceding vehicle corresponding to the current object A (see FIGS. 3 and 4) and an oncoming vehicle in the opposite lane when one's own vehicle is running, and thus, driving efficiency may be enhanced and glare of the lamp 10 to at least one of a driver of the preceding vehicle and a driver of the oncoming vehicle in the opposite lane may be inhibited, whereby traffic accidents may be prevented.

In addition, according to the apparatus 1600 according to the fourth embodiment of the present invention and the method 1700, 1800 or 1900 of controlling a lamp for vehicles using the apparatus 1600, it may be identified that adjustment of the level of current brightness information is completed, when adjustment of the level of current brightness information is completed so as to emit light by adjusting the current brightness information to the range of reference brightness information.

Thus, according to the apparatus 1600 according to the fourth embodiment of the present invention and the method 1700, 1800 or 1900 of controlling a lamp for vehicles using the apparatus 1600, a driver may recognize that adjustment of the level of current brightness information is completed, which encourages the driver to carefully drive, whereby traffic accidents may be prevented.

As is apparent from the above description, according to an apparatus and method for controlling a lamp for vehicles, the following effects may be obtained.

First, driving efficiency may be enhanced and occurrence of glare to at least one of a driver of a preceding vehicle and a driver of an oncoming vehicle in the opposite lane may be inhibited, whereby traffic accidents may be prevented.

Second, a driver may be encouraged to carefully drive and, accordingly, traffic accidents may be further prevented.

It will be understood by those of ordinary skill in the art to which the present invention pertains that the invention may be embodied in other particular forms without modifying technical teachings or essential features of the invention. Thus, it should be understood that the above-described embodiments are provided for illustrative purposes only and are not intended to limit the scope and spirit of the invention. The scope of the invention is defined by the following claims rather than the detailed description and all the modifications or modified forms derived from the meanings, scopes and equivalents of claims should be interpreted as within the scope of the invention.

What is claimed is:

1. An apparatus for controlling a lamp for vehicles, the apparatus comprising:
   a first sensing unit to sense information regarding approaching to a current object when one's own vehicle is running;
   a second sensing unit to sense current brightness information of the lamp installed at the vehicle when the vehicle is running;
   a control unit receiving the information regarding approaching to a current object sensed by the first sensing unit and the current brightness information sensed by the second sensing unit and comprising a range of information regarding approaching to a preset reference object and a range of reference brightness information;
   a determination unit to determine, under control of the control unit, whether the information regarding approaching to a current object sensed by the first sensing unit is within the range of information regarding approaching to a preset reference object and the current brightness information sensed by the second sensing unit is outside the range of reference brightness information;
   a brightness level adjustment unit to adjust a level of the current brightness information of the lamp under control of the control unit so as to emit light by adjusting the current brightness information to the range of reference brightness information, when the determination unit determines that the information regarding approaching to a current object is within the range of information regarding approaching to a preset reference object and the current brightness information is outside the range of reference brightness information; and
   a first identification unit to identify a level state of the current brightness information when the determination unit determines that the information regarding approaching to a current object is within the range of information regarding approaching to a preset reference object and the current brightness information is outside the range of reference brightness information,
   wherein:
   the current brightness information comprises information on a brightness area on a current road surface; and
   the range of reference brightness information comprises information on a range of at least one of a first brightness area and a second brightness area of a reference road surface.

2. The apparatus according to claim 1, wherein:
   the current brightness information is at least one of a current high beam emission amount and a current low beam emission amount; and
   the range of reference brightness information is a range of at least one of a reference high beam emission amount and a reference low beam emission amount.

3. The apparatus according to claim 1, wherein:
   the information regarding approaching to a current object is at least one of remaining distance and approach speed and time to reach the current object; and
   the information regarding approaching to a reference object is at least one of remaining distance and approach speed and time to reach the reference object.

4. The apparatus according to claim 1, wherein, when the determination unit determines that the information regarding approaching to a current object is within the range of information regarding approaching to a preset reference object and a current high beam emission amount corresponding to the current brightness information is outside a range of a reference low beam emission amount corresponding to the range of reference brightness information, the brightness level adjustment unit decreases a level of the current high beam emission amount corresponding to the current brightness information under control of the control unit so as to emit light by adjusting the current high beam emission amount to the range of the reference low beam emission amount.

5. The apparatus according to claim 1, wherein, when the determination unit determines that the information regarding approaching to a current object is outside the range of information regarding approaching to a preset reference object and a current low beam emission amount corresponding to the current brightness information is outside a range of a reference high beam emission amount corresponding to the range of reference brightness information, the brightness level adjustment unit increases a level of the current low beam emission amount corresponding to the current brightness information of the lamp under control of the control unit so as to emit light by adjusting the current low beam emission amount to the range of the reference high beam emission amount.

6. The apparatus according to claim 1, further comprising a second identification unit to identify adjustment of a level of the current brightness information when the determination unit determines that the information regarding approaching to a current object is within the range of information regarding approaching to a preset reference object and the current brightness information is outside the range of reference brightness information.

7. The apparatus according to claim 1, further comprising a third identification unit to identify that adjustment of a level of the current brightness information is completed when the brightness level adjustment unit completes adjustment of the level of current brightness information of the lamp under control of the control unit so as to emit light by adjusting the current brightness information to the range of reference brightness information.

8. A method of controlling a lamp for vehicles, the method comprising:
sensing information regarding approaching to a current object when one's own vehicle is running, the sensing being performed by a first sensing unit;
sensing current brightness information of the lamp installed at the vehicle when the vehicle is running, the sensing being performed by a second sensing unit;
determining, by a determination unit, under control of a control unit, whether the information regarding approaching to a current object sensed by the first sensing unit is within a range of information regarding approaching to a preset reference object, the range being set by the control unit and the current brightness information sensed by the second sensing unit is outside a range of reference brightness information set by the control unit;
adjusting a level of the current brightness information of the lamp under control of the control unit so as to emit light by adjusting the current brightness information to the range of reference brightness information, the adjusting being performed by a brightness level adjustment unit, when the determination unit determines that the information regarding approaching to a current object is within the range of information approaching to a preset reference objet and the current brightness information is outside the range of reference brightness information; and
performing first identification to identify a level state of the current brightness information, the performing being performed by a first identification unit, when the determination unit determines that the information regarding approaching to a current object is within the range of information approaching to a preset reference object and the current brightness information is outside the range of reference brightness information,
wherein, in at least one of the sensing of the current brightness information, the determining, and the adjusting, the current brightness information comprises information on a brightness area of a current road surface, and the range of reference brightness information comprises information on a range of a first brightness area of a reference road surface and a range of a second brightness area of the reference road surface.

9. The method according to claim 8, wherein, in at least one of the sensing of the current brightness information, the determining, and the adjusting, the current brightness information is at least one of a current high beam emission amount and a current low beam emission amount, and the range of reference brightness information is a range of at least one of a reference high beam emission amount and a reference low beam emission amount.

10. The method according to claim 8, wherein, in at least one of the sensing of the information, the determining, and the adjusting, the information regarding approaching to a current object is provided as at least one of remaining distance and approach speed and time to reach the current object and the information regarding approaching to a preset reference object is provided as a range of at least one of remaining distance and approach speed and time to reach the reference object.

11. The method according to claim 8, wherein, when the determination unit determines that the information regarding approaching to a current object is within the range of information approaching to a preset reference object and a current high beam emission amount corresponding to the current brightness information is outside a range of a reference low beam emission amount corresponding to the range of reference brightness information, the adjusting comprises decreasing a level of the current high beam emission amount corresponding to the current brightness information of the lamp under control of the control unit so as to emit light by adjusting the current high beam emission amount to the range of the reference low beam emission amount, the adjusting being performed by the brightness level adjustment unit.

12. The method according to claim 8, wherein, when the determination unit determines that the information regarding approaching to a current object is outside the range of information approaching to a preset reference object and a current low beam emission amount corresponding to the current brightness information is outside a range of a reference high beam emission amount corresponding to the range of reference brightness information, the adjusting comprises increasing a level of the current low beam emission amount corresponding to the current brightness information of the lamp under control of the control unit so as to emit light by adjusting the current low beam emission amount to the range of the reference high beam emission amount, the adjusting being performed by the brightness level adjustment unit.

13. The method according to claim 8, further comprising, after the determining, performing second identification to identify adjustment of a level of the current brightness information, the performing being performed by a second identification unit, when the determination unit determines that the information regarding approaching to a current object is within the range of information approaching to a preset reference object and the current brightness information is outside the range of reference brightness information.

14. The method according to claim 8, further comprising, after the adjusting, performing third identification to identify that the adjusting of the level of the current brightness information is completed, the performing being performed by a third identification unit, when the brightness level adjustment unit completes adjustment of the level of the current brightness information of the lamp under control of the control unit so as to emit light by adjusting the current brightness information to the range of reference brightness information.

15. The apparatus according to claim 1, wherein, when the determination unit determines that at least one of remaining distance and approach speed and time to reach the current object is within the range of at least one of remaining distance and approach speed and time to reach the reference object and the brightness area of the current road surface that corresponds to the current brightness information is outside the range of the first brightness area of the reference road surface that corresponds to the range of reference brightness information, the brightness level adjustment unit decreases the brightness area of the current road surface that corresponds to the current brightness information of the lamp under control of the control unit so as to display the brightness area of the current road surface to be adjusted to the range of the first brightness area of the reference road surface, and wherein, when the determination unit determines that at least one of remaining distance and approach speed and time to reach the current object is outside the range of at least one of remaining distance and approach speed and time to reach the reference object and the brightness area of the current road surface that corresponds to the current brightness information is outside the range of the second brightness area of the reference road surface that corresponds to the range of reference brightness information, the brightness level adjustment unit increases the brightness area of the current road surface that corresponds to the current brightness information of the lamp under control of the control unit so as to display the brightness area of the current road surface to the range of the second brightness area of the reference road surface.

16. The method according to claim 8, wherein the adjusting comprises, when the determination unit determines that at least one of remaining distance and approach speed and time to reach the current object is within the range of at least one of remaining distance and approach speed and time to reach the reference object and the brightness area of the current road surface that corresponds to the current brightness information is outside the range of the first brightness area of the reference road surface that corresponds to the range of reference brightness information, decreasing, by the brightness level adjustment unit, the brightness area of the current road surface that corresponds to the current brightness information of the lamp under control of the control unit so as to display the brightness area of the current road surface to be adjusted to the range of the first brightness area of the reference road surface, and wherein the adjusting comprises, when the determination unit determines that at least one of remaining distance and approach speed and time to reach the current object is outside the range of at least one of remaining distance and approach speed and time to reach the reference object and the brightness area of the current road surface that corresponds to the current brightness information is outside the range of the second brightness area of the reference road surface that corresponds to the range of reference brightness information, increasing, by the brightness level adjustment unit, the brightness area of the current road surface that corresponds to the current brightness information of the lamp under control of the control unit so as to display the brightness area of the current road surface to the range of the second brightness area of the reference road surface.

17. An apparatus for controlling a lamp for vehicles, the apparatus comprising:

a first sensing unit to sense information regarding approaching to a current object when one's own vehicle is running;

a second sensing unit to sense current brightness information of the lamp installed at the vehicle when the vehicle is running;

a control unit receiving the information regarding approaching to a current object sensed by the first sensing unit and the current brightness information sensed by the second sensing unit and comprising a range of information regarding approaching to a preset reference object and a range of reference brightness information;

a determination unit to determine, under control of the control unit, whether the information regarding approaching to a current object sensed by the first sensing unit is within the range of information regarding approaching to a preset reference object and the current brightness information sensed by the second sensing unit is outside the range of reference brightness information;

a brightness level adjustment unit to adjust a level of the current brightness information of the lamp under control of the control unit so as to emit light by adjusting the current brightness information to the range of reference brightness information, when the determination unit determines that the information regarding approaching to a current object is within the range of information regarding approaching to a preset reference object and the current brightness information is outside the range of reference brightness information; and a first identification unit to identify a level state of the current brightness information when the determination unit determines that the information regarding approaching to a current object is within the range of information regarding approaching to a preset reference object and the current brightness information is outside the range of reference brightness information, wherein, when the determination unit determines that the information regarding approaching to a current object is within the range of information regarding approaching to a preset reference object and a current high beam emission amount corresponding to the current brightness information is outside a range of a reference low beam emission amount corresponding to the range of reference brightness information, the brightness level adjustment unit decreases a level of the current high beam emission amount corresponding to the current brightness information under control of the control unit so as to emit light by adjusting the current high beam emission amount to correspond to the range of the reference low beam emission amount, and wherein, when the determination unit determines that the information regarding approaching to a current object is outside the range of information regarding approaching to a preset reference object and a current low beam emission amount corresponding to the current brightness information is outside a range of a reference high beam emission amount corresponding to the range of reference brightness information, the brightness level adjustment unit increases a level of the current low beam emission amount corresponding to the current brightness information of the lamp under control of the control unit so as to emit light by adjusting the current low beam emission amount to correspond to the range of the reference high beam emission amount, and wherein:

the current brightness information comprises information on a brightness area on a current road surface; and the range of reference brightness information comprises information on a range of at least one of a first brightness area and a second brightness area of a reference road surface.

* * * * *

UNITED STATES PATENT AND TRADEMARK OFFICE
CERTIFICATE OF CORRECTION

PATENT NO. : 9,783,126 B2
APPLICATION NO. : 14/305379
DATED : October 10, 2017
INVENTOR(S) : Jun-Hee Lee Page 1 of 1

It is certified that error appears in the above-identified patent and that said Letters Patent is hereby corrected as shown below:

In the Claims

Column 25, Line 37:
The word "objet" should read "object".

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*